(12) United States Patent
Lopez Camacho

(10) Patent No.: US 12,551,240 B2
(45) Date of Patent: Feb. 17, 2026

(54) DISTRACTION LOSS MAGNET ON-OFF MECHANISM

(71) Applicant: NuVasive Specialized Orthopedics, Inc., San Diego, CA (US)

(72) Inventor: Jorge Lopez Camacho, Oxnard, CA (US)

(73) Assignee: Nuvasive Inc., San Diego, CA (US)

( * ) Notice: Subject to any disclaimer, the term of this patent is extended or adjusted under 35 U.S.C. 154(b) by 873 days.

(21) Appl. No.: 17/806,552

(22) Filed: Jun. 13, 2022

(65) Prior Publication Data

US 2023/0397935 A1   Dec. 14, 2023

(51) Int. Cl.
*A61B 17/68* (2006.01)
*A61B 5/151* (2006.01)
(Continued)

(52) U.S. Cl.
CPC .............. *A61B 17/68* (2013.01); *A61B 34/73* (2016.02); *A61B 5/15123* (2013.01);
(Continued)

(58) Field of Classification Search
CPC ............ A61B 17/7216; A61B 17/7225; A61B 17/7014; A61B 17/7016; A61B 17/62; A61B 17/66; A61B 17/68; A61B 17/72; A61B 17/7233; A61B 17/7283; A61B 17/7291; A61B 17/725; A61B 17/74; A61B 17/742; A61B 17/1707; A61B 17/52; A61B 2017/681; A61B 2017/564; A61B 2017/00411; A61B 2017/00876; A61B 34/73; A61B 5/15115; A61B 5/15123;
(Continued)

(56) References Cited

U.S. PATENT DOCUMENTS

| 2,702,031 A | 2/1955 | Wenger |
| 3,111,945 A | 11/1963 | Von Solbrig |

(Continued)

FOREIGN PATENT DOCUMENTS

| CN | 1697630 A | 11/2005 |
| CN | 101040807 A | 9/2007 |

(Continued)

OTHER PUBLICATIONS

Abe et al., "Experimental external fixation combined with percutaneous discectomy in the management of scoliosis.", Spine, 1999, pp. 646-653, 24, No. 7.

(Continued)

*Primary Examiner* — Marcela I. Shirsat

(57) ABSTRACT

Disclosed herein are lock mechanisms configured for locking and unlocking rotation of a driver and a driven gear system in implantable distraction and compression systems, and implantable medical devices and implantable distraction and compression systems including such lock mechanisms. The lock mechanisms include a keeper that is configured to move from a locked position to an unlocked position in response to a rotation of the driver, wherein, in the locked position, the keeper is configured to resist rotation of the driven features and the driver under a load on the driven features, and in the unlocked position, permits rotation of the drive gear and the driver.

20 Claims, 15 Drawing Sheets

(51) Int. Cl.
- *A61B 17/00* (2006.01)
- *A61B 17/17* (2006.01)
- *A61B 17/52* (2006.01)
- *A61B 17/56* (2006.01)
- *A61B 17/66* (2006.01)
- *A61B 17/70* (2006.01)
- *A61B 17/72* (2006.01)
- *A61B 34/00* (2016.01)

(52) U.S. Cl.
CPC ........... *A61B 2017/00411* (2013.01); *A61B 2017/00876* (2013.01); *A61B 17/1707* (2013.01); *A61B 17/52* (2013.01); *A61B 2017/564* (2013.01); *A61B 17/66* (2013.01); *A61B 2017/681* (2013.01); *A61B 17/7016* (2013.01); *A61B 17/72* (2013.01); *A61B 17/7216* (2013.01); *A61B 17/7225* (2013.01); *A61B 2034/731* (2016.02); *A61B 2034/732* (2016.02); *A61B 2034/733* (2016.02)

(58) Field of Classification Search
CPC ........ A61B 2034/731; A61B 2034/732; A61B 2034/733
USPC ..... 606/86 R, 53, 55, 57, 58, 60, 62, 63, 64, 606/65.66, 67, 68, 104, 105
See application file for complete search history.

(56) References Cited

U.S. PATENT DOCUMENTS

| | | |
|---|---|---|
| 3,372,476 A | 3/1968 | Peiffer |
| 3,377,576 A | 4/1968 | Langberg |
| 3,512,901 A | 5/1970 | Law |
| 3,597,781 A | 8/1971 | Eibes |
| 3,900,025 A | 8/1975 | Barnes, Jr. |
| 3,915,151 A | 10/1975 | Kraus |
| RE28,907 E | 7/1976 | Eibes et al. |
| 3,976,060 A | 8/1976 | Hildebrandt et al. |
| 4,010,758 A | 3/1977 | Rockland et al. |
| 4,056,743 A | 11/1977 | Clifford et al. |
| 4,068,821 A | 1/1978 | Morrison |
| 4,078,559 A | 3/1978 | Nissinen |
| 4,204,541 A | 5/1980 | Kapitanov |
| 4,357,946 A | 11/1982 | Dutcher et al. |
| 4,386,603 A | 6/1983 | Mayfield |
| 4,448,191 A | 5/1984 | Rodnyansky et al. |
| 4,486,176 A | 12/1984 | Tardieu et al. |
| 4,501,266 A | 2/1985 | McDaniel |
| 4,522,501 A | 6/1985 | Shannon |
| 4,537,520 A | 8/1985 | Ochiai et al. |
| 4,550,279 A | 10/1985 | Klein |
| 4,561,798 A | 12/1985 | Elcrin et al. |
| 4,573,454 A | 3/1986 | Hoffman |
| 4,592,355 A | 6/1986 | Antebi |
| 4,595,007 A | 6/1986 | Mericle |
| 4,642,257 A | 2/1987 | Chase |
| 4,658,809 A | 4/1987 | Ulrich et al. |
| 4,700,091 A | 10/1987 | Wuthrich |
| 4,747,832 A | 5/1988 | Buffet |
| 4,854,304 A | 8/1989 | Zielke |
| 4,904,861 A | 2/1990 | Epstein et al. |
| 4,931,055 A | 6/1990 | Bumpus et al. |
| 4,940,467 A | 7/1990 | Tronzo |
| 4,957,495 A | 9/1990 | Kluger |
| 4,973,331 A | 11/1990 | Pursley et al. |
| 5,010,879 A | 4/1991 | Moriya et al. |
| 5,030,235 A | 7/1991 | Campbell, Jr. |
| 5,041,112 A | 8/1991 | Mingozzi et al. |
| 5,064,004 A | 11/1991 | Lundell |
| 5,074,882 A | 12/1991 | Grammont et al. |
| 5,092,889 A | 3/1992 | Campbell, Jr. |
| 5,133,716 A | 7/1992 | Plaza |
| 5,142,407 A | 8/1992 | Varaprasad et al. |
| 5,156,605 A | 10/1992 | Pursley et al. |
| 5,263,955 A | 11/1993 | Baumgart et al. |
| 5,290,289 A | 3/1994 | Sanders et al. |
| 5,306,275 A | 4/1994 | Bryan |
| 5,330,503 A | 7/1994 | Yoon |
| 5,334,202 A | 8/1994 | Carter |
| 5,336,223 A | 8/1994 | Rogers |
| 5,356,411 A | 10/1994 | Spievack |
| 5,356,424 A | 10/1994 | Buzerak et al. |
| 5,364,396 A | 11/1994 | Robinson et al. |
| 5,403,322 A | 4/1995 | Herzenberg et al. |
| 5,429,638 A | 7/1995 | Muschler et al. |
| 5,437,266 A | 8/1995 | McPherson et al. |
| 5,466,261 A | 11/1995 | Richelsoph |
| 5,468,030 A | 11/1995 | Walling |
| 5,480,437 A | 1/1996 | Draenert |
| 5,509,888 A | 4/1996 | Miller |
| 5,516,335 A | 5/1996 | Kummer et al. |
| 5,527,309 A | 6/1996 | Shelton |
| 5,536,269 A | 7/1996 | Spievack |
| 5,549,610 A | 8/1996 | Russell et al. |
| 5,573,012 A | 11/1996 | McEwan |
| 5,575,790 A | 11/1996 | Chen et al. |
| 5,582,616 A | 12/1996 | Bolduc et al. |
| 5,620,445 A | 4/1997 | Brosnahan et al. |
| 5,620,449 A | 4/1997 | Faccioli et al. |
| 5,626,579 A | 5/1997 | Muschler et al. |
| 5,626,613 A | 5/1997 | Schmieding |
| 5,632,744 A | 5/1997 | Campbell, Jr. |
| 5,659,217 A | 8/1997 | Petersen |
| 5,662,683 A | 9/1997 | Kay |
| 5,672,175 A | 9/1997 | Martin |
| 5,672,177 A | 9/1997 | Seldin |
| 5,700,263 A | 12/1997 | Schendel |
| 5,704,938 A | 1/1998 | Staehlin et al. |
| 5,704,939 A | 1/1998 | Justin |
| 5,720,746 A | 2/1998 | Soubeiran |
| 5,743,910 A | 4/1998 | Bays et al. |
| 5,762,599 A | 6/1998 | Sohn |
| 5,771,903 A | 6/1998 | Jakobsson |
| 5,810,815 A | 9/1998 | Morales |
| 5,827,286 A | 10/1998 | Incavo et al. |
| 5,830,221 A | 11/1998 | Stein et al. |
| 5,879,375 A | 3/1999 | Larson, Jr. et al. |
| 5,902,304 A | 5/1999 | Walker et al. |
| 5,935,127 A | 8/1999 | Border |
| 5,945,762 A | 8/1999 | Chen et al. |
| 5,961,553 A | 10/1999 | Coty et al. |
| 5,976,138 A | 11/1999 | Baumgart et al. |
| 5,979,456 A | 11/1999 | Magovern |
| 6,022,349 A | 2/2000 | McLeod et al. |
| 6,033,412 A | 3/2000 | Losken et al. |
| 6,034,296 A | 3/2000 | Elvin et al. |
| 6,102,922 A | 8/2000 | Jakobsson et al. |
| 6,106,525 A | 8/2000 | Sachse |
| 6,126,660 A | 10/2000 | Dietz |
| 6,126,661 A | 10/2000 | Faccioli et al. |
| 6,138,681 A | 10/2000 | Chen et al. |
| 6,139,316 A | 10/2000 | Sachdeva et al. |
| 6,162,223 A | 12/2000 | Orsak et al. |
| 6,183,476 B1 | 2/2001 | Gerhardt et al. |
| 6,200,317 B1 | 3/2001 | Aalsma et al. |
| 6,234,956 B1 | 5/2001 | He et al. |
| 6,241,730 B1 | 6/2001 | Alby |
| 6,245,075 B1 * | 6/2001 | Betz .............. A61B 17/7216 606/90 |
| 6,315,784 B1 | 11/2001 | Djurovic |
| 6,319,255 B1 | 11/2001 | Grundei et al. |
| 6,331,744 B1 | 12/2001 | Chen et al. |
| 6,336,929 B1 | 1/2002 | Justin |
| 6,343,568 B1 | 2/2002 | McClasky |
| 6,358,283 B1 | 3/2002 | Hogfors et al. |
| 6,375,682 B1 | 4/2002 | Fleischmann et al. |
| 6,389,187 B1 | 5/2002 | Greenaway et al. |
| 6,400,980 B1 | 6/2002 | Lemelson |
| 6,402,753 B1 | 6/2002 | Cole et al. |
| 6,409,175 B1 | 6/2002 | Evans et al. |
| 6,416,516 B1 | 7/2002 | Stauch et al. |
| 6,499,907 B1 | 12/2002 | Baur |

(56) References Cited

U.S. PATENT DOCUMENTS

| | | |
|---|---|---|
| 6,500,110 B1 | 12/2002 | Davey et al. |
| 6,508,820 B2 | 1/2003 | Bales |
| 6,510,345 B1 | 1/2003 | Van Bentem |
| 6,537,196 B1 | 3/2003 | Creighton, IV et al. |
| 6,554,831 B1 | 4/2003 | Rivard et al. |
| 6,565,573 B1 | 5/2003 | Ferrante et al. |
| 6,565,576 B1 | 5/2003 | Stauch et al. |
| 6,582,313 B2 | 6/2003 | Perrow |
| 6,583,630 B2 | 6/2003 | Mendes et al. |
| 6,616,669 B2 | 9/2003 | Ogilvie et al. |
| 6,626,917 B1 | 9/2003 | Craig |
| 6,656,135 B2 | 12/2003 | Zogbi et al. |
| 6,656,194 B1 | 12/2003 | Gannoe et al. |
| 6,667,725 B1 | 12/2003 | Simons et al. |
| 6,673,079 B1 | 1/2004 | Kane |
| 6,702,816 B2 | 3/2004 | Buhler |
| 6,706,042 B2 | 3/2004 | Taylor |
| 6,709,293 B2 | 3/2004 | Mori et al. |
| 6,730,087 B1 | 5/2004 | Butsch |
| 6,761,503 B2 | 7/2004 | Breese |
| 6,769,499 B2 | 8/2004 | Cargill et al. |
| 6,789,442 B2 | 9/2004 | Forch |
| 6,796,984 B2 | 9/2004 | Soubeiran |
| 6,802,844 B2 | 10/2004 | Ferree |
| 6,809,434 B1 | 10/2004 | Duncan et al. |
| 6,835,207 B2 | 12/2004 | Zacouto et al. |
| 6,852,113 B2 | 2/2005 | Nathanson et al. |
| 6,918,838 B2 | 7/2005 | Schwarzler et al. |
| 6,918,910 B2 | 7/2005 | Smith et al. |
| 6,921,400 B2 | 7/2005 | Sohngen |
| 6,923,951 B2 | 8/2005 | Contag et al. |
| 6,971,143 B2 | 12/2005 | Domroese |
| 7,001,346 B2 | 2/2006 | White |
| 7,008,425 B2 | 3/2006 | Phillips |
| 7,011,658 B2 | 3/2006 | Young |
| 7,029,472 B1 | 4/2006 | Fortin |
| 7,029,475 B2 | 4/2006 | Panjabi |
| 7,041,105 B2 | 5/2006 | Michelson |
| 7,060,080 B2 | 6/2006 | Bachmann |
| 7,063,706 B2 | 6/2006 | Wittenstein |
| 7,105,029 B2 | 9/2006 | Doubler et al. |
| 7,105,968 B2 | 9/2006 | Nissen |
| 7,114,501 B2 | 10/2006 | Johnson et al. |
| 7,115,129 B2 | 10/2006 | Heggeness |
| 7,135,022 B2 | 11/2006 | Kosashvili et al. |
| 7,160,312 B2 | 1/2007 | Saadat |
| 7,163,538 B2 | 1/2007 | Altarac et al. |
| 7,189,005 B2 | 3/2007 | Ward |
| 7,191,007 B2 | 3/2007 | Desai et al. |
| 7,218,232 B2 | 5/2007 | DiSilvestro et al. |
| 7,238,191 B2 | 7/2007 | Bachmann |
| 7,241,300 B2 | 7/2007 | Sharkawy et al. |
| 7,243,719 B2 | 7/2007 | Baron et al. |
| 7,255,682 B1 | 8/2007 | Bartol, Jr. et al. |
| 7,282,023 B2 | 10/2007 | Frering |
| 7,285,087 B2 | 10/2007 | Moaddeb et al. |
| 7,302,015 B2 | 11/2007 | Kim et al. |
| 7,302,858 B2 | 12/2007 | Walsh et al. |
| 7,314,443 B2 | 1/2008 | Jordan et al. |
| 7,333,013 B2 | 2/2008 | Berger |
| 7,357,037 B2 | 4/2008 | Hnat et al. |
| 7,357,635 B2 | 4/2008 | Belfor et al. |
| 7,360,542 B2 | 4/2008 | Nelson et al. |
| 7,390,007 B2 | 6/2008 | Helms et al. |
| 7,390,294 B2 | 6/2008 | Hassler, Jr. |
| 7,402,134 B2 | 7/2008 | Moaddeb et al. |
| 7,402,176 B2 | 7/2008 | Malek |
| 7,429,259 B2 | 9/2008 | Cadeddu et al. |
| 7,445,010 B2 | 11/2008 | Kugler et al. |
| 7,458,981 B2 | 12/2008 | Fielding et al. |
| 7,485,149 B1 | 2/2009 | White |
| 7,489,495 B2 | 2/2009 | Stevenson |
| 7,530,981 B2 | 5/2009 | Kutsenko |
| 7,531,002 B2 | 5/2009 | Sutton et al. |
| 7,553,298 B2 | 6/2009 | Hunt et al. |
| 7,561,916 B2 | 7/2009 | Hunt et al. |
| 7,611,526 B2 | 11/2009 | Carl et al. |
| 7,618,435 B2 | 11/2009 | Opolski |
| 7,658,754 B2 | 2/2010 | Zhang et al. |
| 7,666,184 B2 | 2/2010 | Stauch |
| 7,666,210 B2 | 2/2010 | Franck et al. |
| 7,678,136 B2 | 3/2010 | Doubler et al. |
| 7,678,139 B2 | 3/2010 | Garamszegi et al. |
| 7,708,737 B2 | 5/2010 | Kraft et al. |
| 7,708,762 B2 | 5/2010 | McCarthy et al. |
| 7,727,143 B2 | 6/2010 | Birk et al. |
| 7,753,913 B2 | 7/2010 | Szakelyhidi, Jr. et al. |
| 7,753,915 B1 | 7/2010 | Eksler et al. |
| 7,762,998 B2 | 7/2010 | Birk et al. |
| 7,763,080 B2 | 7/2010 | Southworth |
| 7,766,855 B2 | 8/2010 | Miethke |
| 7,775,215 B2 | 8/2010 | Hassler, Jr. et al. |
| 7,776,068 B2 | 8/2010 | Ainsworth et al. |
| 7,776,075 B2 | 8/2010 | Bruneau et al. |
| 7,787,958 B2 | 8/2010 | Stevenson |
| 7,794,476 B2 | 9/2010 | Wisnewski |
| 7,811,328 B2 | 10/2010 | Molz, IV et al. |
| 7,835,779 B2 | 11/2010 | Anderson et al. |
| 7,837,691 B2 | 11/2010 | Cordes et al. |
| 7,862,586 B2 | 1/2011 | Malek |
| 7,867,235 B2 | 1/2011 | Fell et al. |
| 7,875,033 B2 | 1/2011 | Richter et al. |
| 7,901,381 B2 | 3/2011 | Birk et al. |
| 7,909,852 B2 | 3/2011 | Boomer et al. |
| 7,918,844 B2 | 4/2011 | Byrum et al. |
| 7,938,841 B2 | 5/2011 | Sharkawy et al. |
| 7,985,256 B2 | 7/2011 | Grotz et al. |
| 7,988,709 B2 | 8/2011 | Clark et al. |
| 8,002,809 B2 | 8/2011 | Baynham |
| 8,011,308 B2 | 9/2011 | Picchio |
| 8,034,080 B2 | 10/2011 | Malandain et al. |
| 8,043,299 B2 | 10/2011 | Conway |
| 8,043,338 B2 | 10/2011 | Dant |
| 8,057,473 B2 | 11/2011 | Orsak et al. |
| 8,057,513 B2 | 11/2011 | Kohm et al. |
| 8,083,741 B2 | 12/2011 | Morgan et al. |
| 8,092,499 B1 | 1/2012 | Roth |
| 8,095,317 B2 | 1/2012 | Ekseth et al. |
| 8,105,360 B1 | 1/2012 | Connor |
| 8,114,158 B2 | 2/2012 | Carl et al. |
| 8,123,805 B2 | 2/2012 | Makower et al. |
| 8,133,280 B2 | 3/2012 | Voellmicke et al. |
| 8,147,549 B2 | 4/2012 | Metcalf, Jr. et al. |
| 8,162,897 B2 | 4/2012 | Byrum |
| 8,162,979 B2 | 4/2012 | Sachs et al. |
| 8,177,789 B2 | 5/2012 | Magill et al. |
| 8,197,490 B2 | 6/2012 | Pool et al. |
| 8,211,149 B2 | 7/2012 | Justis |
| 8,211,151 B2 | 7/2012 | Schwab et al. |
| 8,221,420 B2 | 7/2012 | Keller |
| 8,226,690 B2 | 7/2012 | Altarac et al. |
| 8,236,002 B2 | 8/2012 | Fortin et al. |
| 8,241,331 B2 | 8/2012 | Arnin |
| 8,246,630 B2 | 8/2012 | Manzi et al. |
| 8,252,063 B2 | 8/2012 | Stauch |
| 8,267,969 B2 | 9/2012 | Altarac et al. |
| 8,278,941 B2 | 10/2012 | Kroh et al. |
| 8,282,671 B2 | 10/2012 | Connor |
| 8,323,290 B2 | 12/2012 | Metzger et al. |
| 8,357,182 B2 | 1/2013 | Seme |
| 8,366,628 B2 | 2/2013 | Denker et al. |
| 8,372,078 B2 | 2/2013 | Collazo |
| 8,386,018 B2 | 2/2013 | Stauch et al. |
| 8,394,124 B2 | 3/2013 | Biyani |
| 8,403,958 B2 | 3/2013 | Schwab |
| 8,414,584 B2 | 4/2013 | Brigido |
| 8,425,608 B2 | 4/2013 | Dewey et al. |
| 8,435,268 B2 | 5/2013 | Thompson et al. |
| 8,439,926 B2 | 5/2013 | Bojarski et al. |
| 8,444,693 B2 | 5/2013 | Reiley |
| 8,469,908 B2 | 6/2013 | Asfora |
| 8,470,004 B2 | 6/2013 | Reiley |
| 8,486,070 B2 | 7/2013 | Morgan et al. |
| 8,486,076 B2 | 7/2013 | Chavarria et al. |

(56) References Cited

U.S. PATENT DOCUMENTS

| | | |
|---|---|---|
| 8,486,147 B2 | 7/2013 | De Villiers et al. |
| 8,494,805 B2 | 7/2013 | Roche et al. |
| 8,496,662 B2 | 7/2013 | Novak et al. |
| 8,518,062 B2 | 8/2013 | Cole et al. |
| 8,523,866 B2 | 9/2013 | Sidebotham et al. |
| 8,529,474 B2 | 9/2013 | Gupta et al. |
| 8,529,606 B2 | 9/2013 | Alamin et al. |
| 8,529,607 B2 | 9/2013 | Alamin et al. |
| 8,556,901 B2 | 10/2013 | Anthony et al. |
| 8,556,911 B2 | 10/2013 | Mehta et al. |
| 8,556,975 B2 | 10/2013 | Ciupik et al. |
| 8,562,653 B2 | 10/2013 | Alamin et al. |
| 8,568,457 B2 | 10/2013 | Hunziker |
| 8,579,979 B2 | 11/2013 | Edie et al. |
| 8,585,595 B2 | 11/2013 | Heilman |
| 8,585,740 B1 | 11/2013 | Ross et al. |
| 8,591,549 B2 | 11/2013 | Lange |
| 8,591,553 B2 | 11/2013 | Eisermann et al. |
| 8,613,758 B2 | 12/2013 | Linares |
| 8,617,220 B2 | 12/2013 | Skaggs |
| 8,623,036 B2 | 1/2014 | Harrison et al. |
| 8,632,544 B2 | 1/2014 | Haaja et al. |
| 8,632,548 B2 | 1/2014 | Soubeiran |
| 8,632,563 B2 | 1/2014 | Nagase et al. |
| 8,636,771 B2 | 1/2014 | Butler et al. |
| 8,636,802 B2 | 1/2014 | Serhan et al. |
| 8,641,719 B2 | 2/2014 | Gephart et al. |
| 8,641,723 B2 | 2/2014 | Connor |
| 8,657,856 B2 | 2/2014 | Gephart et al. |
| 8,663,285 B2 | 3/2014 | Dall et al. |
| 8,663,287 B2 | 3/2014 | Butler et al. |
| 8,668,719 B2 | 3/2014 | Alamin et al. |
| 8,709,090 B2 | 4/2014 | Makower et al. |
| 8,758,347 B2 | 6/2014 | Weiner et al. |
| 8,758,355 B2 | 6/2014 | Fisher et al. |
| 8,771,272 B2 | 7/2014 | LeCronier et al. |
| 8,777,947 B2 | 7/2014 | Zahrly et al. |
| 8,777,995 B2 | 7/2014 | McClintock et al. |
| 8,790,343 B2 | 7/2014 | McClellan et al. |
| 8,790,409 B2 | 7/2014 | Van den Heuvel et al. |
| 8,828,058 B2 | 9/2014 | Elsebaie et al. |
| 8,828,087 B2 | 9/2014 | Stone et al. |
| 8,840,651 B2 | 9/2014 | Reiley |
| 8,870,881 B2 | 10/2014 | Rezach et al. |
| 8,870,959 B2 | 10/2014 | Arnin |
| 8,915,915 B2 | 12/2014 | Harrison et al. |
| 8,915,917 B2 | 12/2014 | Doherty et al. |
| 8,920,422 B2 | 12/2014 | Homeier et al. |
| 8,945,188 B2 | 2/2015 | Rezach et al. |
| 8,961,521 B2 | 2/2015 | Keefer et al. |
| 8,961,567 B2 | 2/2015 | Hunziker |
| 8,968,402 B2 | 3/2015 | Myers et al. |
| 8,992,527 B2 | 3/2015 | Guichet |
| 9,022,917 B2 | 5/2015 | Kasic et al. |
| 9,044,218 B2 | 6/2015 | Young |
| 9,060,810 B2 | 6/2015 | Kercher et al. |
| 9,078,703 B2 | 7/2015 | Arnin |
| 2002/0050112 A1 | 5/2002 | Koch et al. |
| 2002/0072758 A1 | 6/2002 | Reo et al. |
| 2002/0164905 A1 | 11/2002 | Bryant |
| 2003/0040671 A1 | 2/2003 | Somogyi et al. |
| 2003/0144669 A1 | 7/2003 | Robinson |
| 2003/0220643 A1 | 11/2003 | Ferree |
| 2003/0220644 A1 | 11/2003 | Thelen et al. |
| 2004/0011137 A1 | 1/2004 | Hnat et al. |
| 2004/0011365 A1 | 1/2004 | Govari et al. |
| 2004/0019353 A1 | 1/2004 | Freid et al. |
| 2004/0023623 A1 | 2/2004 | Stauch et al. |
| 2004/0055610 A1 | 3/2004 | Forsell |
| 2004/0133219 A1 | 7/2004 | Forsell |
| 2004/0138725 A1 | 7/2004 | Forsell |
| 2004/0193266 A1 | 9/2004 | Meyer |
| 2005/0034705 A1 | 2/2005 | McClendon |
| 2005/0049617 A1 | 3/2005 | Chatlynne et al. |
| 2005/0065529 A1 | 3/2005 | Liu et al. |
| 2005/0090823 A1 | 4/2005 | Bartimus |
| 2005/0159754 A1 | 7/2005 | Odrich |
| 2005/0234448 A1 | 10/2005 | McCarthy |
| 2005/0234462 A1 | 10/2005 | Hershberger |
| 2005/0246034 A1 | 11/2005 | Soubeiran |
| 2005/0261779 A1 | 11/2005 | Meyer |
| 2005/0272976 A1 | 12/2005 | Tanaka et al. |
| 2006/0004459 A1 | 1/2006 | Hazebrouck et al. |
| 2006/0009767 A1 | 1/2006 | Kiester |
| 2006/0036259 A1 | 2/2006 | Carl et al. |
| 2006/0036323 A1 | 2/2006 | Carl et al. |
| 2006/0036324 A1 | 2/2006 | Sachs et al. |
| 2006/0047282 A1 | 3/2006 | Gordon |
| 2006/0058792 A1 | 3/2006 | Hynes |
| 2006/0069447 A1 | 3/2006 | DiSilvestro et al. |
| 2006/0074448 A1 | 4/2006 | Harrison et al. |
| 2006/0079897 A1 | 4/2006 | Harrison et al. |
| 2006/0136062 A1 | 6/2006 | DiNello et al. |
| 2006/0142767 A1 | 6/2006 | Green et al. |
| 2006/0155279 A1 | 7/2006 | Ogilvie |
| 2006/0195087 A1 | 8/2006 | Sacher et al. |
| 2006/0195088 A1 | 8/2006 | Sacher et al. |
| 2006/0200134 A1 | 9/2006 | Freid et al. |
| 2006/0204156 A1 | 9/2006 | Takehara et al. |
| 2006/0235299 A1 | 10/2006 | Martinelli |
| 2006/0235424 A1 | 10/2006 | Vitale et al. |
| 2006/0241746 A1 | 10/2006 | Shaoulian et al. |
| 2006/0241767 A1 | 10/2006 | Doty |
| 2006/0249914 A1 | 11/2006 | Dulin |
| 2006/0271107 A1 | 11/2006 | Harrison et al. |
| 2006/0282073 A1 | 12/2006 | Simanovsky |
| 2006/0293683 A1 | 12/2006 | Stauch |
| 2007/0010814 A1 | 1/2007 | Stauch |
| 2007/0010887 A1 | 1/2007 | Williams et al. |
| 2007/0021644 A1 | 1/2007 | Woolson et al. |
| 2007/0031131 A1 | 2/2007 | Griffitts |
| 2007/0043376 A1 | 2/2007 | Leatherbury et al. |
| 2007/0050030 A1 | 3/2007 | Kim |
| 2007/0118215 A1 | 5/2007 | Moaddeb |
| 2007/0161984 A1 | 7/2007 | Cresina et al. |
| 2007/0173837 A1 | 7/2007 | Chan et al. |
| 2007/0179493 A1 | 8/2007 | Kim |
| 2007/0185374 A1 | 8/2007 | Kick et al. |
| 2007/0233098 A1 | 10/2007 | Mastrorio et al. |
| 2007/0239159 A1 | 10/2007 | Altarac et al. |
| 2007/0239161 A1 | 10/2007 | Giger et al. |
| 2007/0255088 A1 | 11/2007 | Jacobson et al. |
| 2007/0270803 A1 | 11/2007 | Giger et al. |
| 2007/0276368 A1 | 11/2007 | Trieu et al. |
| 2007/0276369 A1 | 11/2007 | Allard et al. |
| 2007/0276373 A1 | 11/2007 | Malandain |
| 2007/0276378 A1 | 11/2007 | Harrison et al. |
| 2007/0276493 A1 | 11/2007 | Malandain et al. |
| 2007/0288024 A1 | 12/2007 | Gollogly |
| 2007/0288183 A1 | 12/2007 | Bulkes et al. |
| 2008/0009792 A1 | 1/2008 | Henniges et al. |
| 2008/0015577 A1 | 1/2008 | Loeb |
| 2008/0021454 A1 | 1/2008 | Chao et al. |
| 2008/0021455 A1 | 1/2008 | Chao et al. |
| 2008/0021456 A1 | 1/2008 | Gupta et al. |
| 2008/0027436 A1 | 1/2008 | Cournoyer et al. |
| 2008/0033431 A1 | 2/2008 | Jung et al. |
| 2008/0033436 A1 | 2/2008 | Song et al. |
| 2008/0051784 A1 | 2/2008 | Gollogly |
| 2008/0082118 A1 | 4/2008 | Edidin et al. |
| 2008/0086128 A1 | 4/2008 | Lewis |
| 2008/0097487 A1 | 4/2008 | Pool et al. |
| 2008/0097496 A1 | 4/2008 | Chang et al. |
| 2008/0108995 A1 | 5/2008 | Conway et al. |
| 2008/0161933 A1 | 7/2008 | Grotz et al. |
| 2008/0167685 A1 | 7/2008 | Allard et al. |
| 2008/0172063 A1 | 7/2008 | Taylor |
| 2008/0177319 A1 | 7/2008 | Schwab |
| 2008/0177326 A1 | 7/2008 | Thompson |
| 2008/0190237 A1 | 8/2008 | Radinger et al. |
| 2008/0228186 A1 | 9/2008 | Gall et al. |
| 2008/0255615 A1 | 10/2008 | Vittur et al. |
| 2008/0272928 A1 | 11/2008 | Shuster |
| 2008/0275557 A1 | 11/2008 | Makower et al. |

(56) References Cited

U.S. PATENT DOCUMENTS

| | | | |
|---|---|---|---|
| 2009/0030462 A1 | 1/2009 | Buttermann | |
| 2009/0076597 A1* | 3/2009 | Dahlgren | A61F 2/2445 |
| | | | 606/53 |
| 2009/0082815 A1 | 3/2009 | Zylber et al. | |
| 2009/0088803 A1 | 4/2009 | Justis et al. | |
| 2009/0093820 A1 | 4/2009 | Trieu et al. | |
| 2009/0093890 A1 | 4/2009 | Gelbart | |
| 2009/0112263 A1 | 4/2009 | Pool et al. | |
| 2009/0163780 A1 | 6/2009 | Tieu | |
| 2009/0171356 A1 | 7/2009 | Klett | |
| 2009/0192514 A1 | 7/2009 | Feinberg et al. | |
| 2009/0198144 A1 | 8/2009 | Phillips et al. | |
| 2009/0216113 A1 | 8/2009 | Meier et al. | |
| 2009/0275984 A1 | 11/2009 | Kim et al. | |
| 2010/0004654 A1 | 1/2010 | Schmitz et al. | |
| 2010/0004697 A1 | 1/2010 | Fortin et al. | |
| 2010/0057127 A1 | 3/2010 | McGuire et al. | |
| 2010/0094306 A1 | 4/2010 | Chang et al. | |
| 2010/0100185 A1 | 4/2010 | Trieu et al. | |
| 2010/0106192 A1 | 4/2010 | Barry | |
| 2010/0114322 A1 | 5/2010 | Clifford et al. | |
| 2010/0130941 A1 | 5/2010 | Conlon et al. | |
| 2010/0137872 A1 | 6/2010 | Kam et al. | |
| 2010/0145449 A1 | 6/2010 | Makower et al. | |
| 2010/0145462 A1 | 6/2010 | Ainsworth et al. | |
| 2010/0168751 A1 | 7/2010 | Anderson et al. | |
| 2010/0249782 A1 | 9/2010 | Durham | |
| 2010/0256626 A1 | 10/2010 | Muller et al. | |
| 2010/0262239 A1 | 10/2010 | Boyden et al. | |
| 2010/0318129 A1 | 12/2010 | Seme et al. | |
| 2010/0331883 A1 | 12/2010 | Schmitz et al. | |
| 2011/0004076 A1 | 1/2011 | Janna et al. | |
| 2011/0057756 A1 | 3/2011 | Marinescu et al. | |
| 2011/0060336 A1* | 3/2011 | Pool | A61B 17/1725 |
| | | | 606/62 |
| 2011/0066188 A1 | 3/2011 | Seme et al. | |
| 2011/0098748 A1 | 4/2011 | Jangra | |
| 2011/0152725 A1 | 6/2011 | Demir et al. | |
| 2011/0196435 A1 | 8/2011 | Forsell | |
| 2011/0202138 A1 | 8/2011 | Shenoy et al. | |
| 2011/0238126 A1 | 9/2011 | Soubeiran | |
| 2011/0257655 A1 | 10/2011 | Copf, Jr. | |
| 2011/0284014 A1 | 11/2011 | Cadeddu et al. | |
| 2012/0019341 A1 | 1/2012 | Gabay et al. | |
| 2012/0019342 A1 | 1/2012 | Gabay et al. | |
| 2012/0053633 A1 | 3/2012 | Stauch | |
| 2012/0088953 A1 | 4/2012 | King | |
| 2012/0109207 A1 | 5/2012 | Trieu | |
| 2012/0116535 A1 | 5/2012 | Ratron et al. | |
| 2012/0158061 A1 | 6/2012 | Koch et al. | |
| 2012/0172883 A1 | 7/2012 | Sayago | |
| 2012/0179215 A1 | 7/2012 | Soubeiran | |
| 2012/0221106 A1 | 8/2012 | Makower et al. | |
| 2012/0271353 A1 | 10/2012 | Barry | |
| 2012/0296234 A1 | 11/2012 | Wilhelm et al. | |
| 2012/0329882 A1 | 12/2012 | Messersmith et al. | |
| 2013/0013066 A1 | 1/2013 | Landry et al. | |
| 2013/0072932 A1 | 3/2013 | Stauch | |
| 2013/0123847 A1 | 5/2013 | Anderson et al. | |
| 2013/0138017 A1 | 5/2013 | Jundt et al. | |
| 2013/0138154 A1 | 5/2013 | Reiley | |
| 2013/0150863 A1 | 6/2013 | Baumgartner | |
| 2013/0150889 A1 | 6/2013 | Fening et al. | |
| 2013/0178903 A1 | 7/2013 | Abdou | |
| 2013/0211521 A1 | 8/2013 | Shenoy et al. | |
| 2013/0245692 A1 | 9/2013 | Hayes et al. | |
| 2013/0253344 A1 | 9/2013 | Griswold et al. | |
| 2013/0253587 A1 | 9/2013 | Carls et al. | |
| 2013/0261672 A1 | 10/2013 | Horvath | |
| 2013/0296863 A1 | 11/2013 | Globerman et al. | |
| 2013/0296864 A1 | 11/2013 | Burley et al. | |
| 2013/0296940 A1 | 11/2013 | Northcutt et al. | |
| 2013/0325006 A1 | 12/2013 | Michelinie et al. | |
| 2013/0325071 A1 | 12/2013 | Niemiec et al. | |
| 2014/0005788 A1 | 1/2014 | Haaja et al. | |
| 2014/0025172 A1 | 1/2014 | Lucas et al. | |
| 2014/0052134 A1 | 2/2014 | Orisek | |
| 2014/0058392 A1 | 2/2014 | Mueckter et al. | |
| 2014/0058450 A1 | 2/2014 | Arlet | |
| 2014/0066987 A1 | 3/2014 | Hestad et al. | |
| 2014/0088715 A1 | 3/2014 | Ciupik | |
| 2014/0128920 A1 | 5/2014 | Kantelhardt | |
| 2014/0163664 A1 | 6/2014 | Goldsmith | |
| 2014/0195003 A1 | 7/2014 | Pool | |
| 2014/0236234 A1 | 8/2014 | Kroll et al. | |
| 2014/0236311 A1 | 8/2014 | Vicatos et al. | |
| 2014/0257412 A1 | 9/2014 | Patty et al. | |
| 2014/0277446 A1 | 9/2014 | Clifford et al. | |
| 2014/0296918 A1 | 10/2014 | Fening et al. | |
| 2014/0303538 A1 | 10/2014 | Baym et al. | |
| 2014/0303539 A1 | 10/2014 | Baym et al. | |
| 2014/0358150 A1 | 12/2014 | Kaufman et al. | |
| 2015/0105782 A1 | 4/2015 | D'Lima et al. | |
| 2015/0105824 A1 | 4/2015 | Moskowitz et al. | |
| 2017/0035470 A1* | 2/2017 | Pool | A61B 17/84 |
| 2018/0221062 A1* | 8/2018 | Hunziker | A61B 1/00158 |
| 2020/0030003 A1 | 1/2020 | Charest et al. | |
| 2022/0273343 A1* | 9/2022 | Bae | A61B 17/7216 |
| 2023/0041121 A1* | 2/2023 | Lopez Camacho | |
| | | | A61B 17/7225 |

FOREIGN PATENT DOCUMENTS

| | | |
|---|---|---|
| DE | 1541262 A1 | 6/1969 |
| DE | 8515687 U1 | 12/1985 |
| DE | 19626230 A1 | 1/1998 |
| DE | 19745654 A1 | 4/1999 |
| DE | 102005045070 A1 | 4/2007 |
| EP | 0663184 A1 | 7/1995 |
| EP | 1905388 A1 | 4/2008 |
| FR | 2901991 A1 | 12/2007 |
| FR | 2900563 B1 | 8/2008 |
| FR | 2892617 B1 | 9/2008 |
| FR | 2916622 B1 | 9/2009 |
| FR | 2961386 B1 | 12/2011 |
| JP | H0956736 | 3/1997 |
| JP | 2002500063 A | 1/2002 |
| WO | WO1998044858 A1 | 10/1998 |
| WO | WO1999051160 A1 | 10/1999 |
| WO | WO2001024697 A1 | 4/2001 |
| WO | WO2001045485 A3 | 6/2001 |
| WO | WO2001045487 A2 | 6/2001 |
| WO | WO2001067973 A2 | 9/2001 |
| WO | WO2001078614 A1 | 10/2001 |
| WO | WO2007013059 A3 | 2/2007 |
| WO | WO2007015239 A3 | 2/2007 |
| WO | WO2011116158 A3 | 9/2011 |
| WO | WO2013119528 A1 | 8/2013 |
| WO | WO2014040013 A1 | 3/2014 |
| WO | 2021045946 A1 | 3/2021 |
| WO | 2022015898 A1 | 1/2022 |

OTHER PUBLICATIONS

Ahlbom et al., "Guidelines for limiting exposure to time-varying electric, magnetic, and electromagnetic fields (up to 300 GHz). International Commission on Non-Ionizing Radiation Protection.", Health Physics, 1998, pp. 494-522, 74, No. 4.

Amer et al., "Evaluation of treatment of late-onset tibia vara using gradual angulation translation high tibial osteotomy", ACTA Orthopaedica Belgica, 2010, pp. 360-366, 76, No. 3.

Angrisani et al., "Lap-Band® Rapid Port™ System: Preliminary results in 21 patients", Obesity Surgery, 2005, p. 936, 15, No. 7.

Baumgart et al., "A fully implantable, programmable distraction nail (Fitbone)—new perspectives for corrective and reconstructive limb surgery.", Practice of Intramedullary Locked Nails, 2006, pp. 189-198.

Baumgart et al., "The bioexpandable prosthesis: A new perspective after resection of malignant bone tumors in children.", J Pediatr Hematol Oncol, 2005, pp. 452-455, 27, No. 8.

(56) References Cited

OTHER PUBLICATIONS

Bodó et al., "Development of a tension-adjustable implant for anterior cruciate ligament reconstruction.", Eklem Hastaliklari ve Cerrahisi—Joint Diseases and Related Surgery, 2008, pp. 27-32, 19, No. 1.

Boudjemline et al., "Off-label use of an adjustable gastric banding system for pulmonary artery banding.", The Journal of Thoracic and Cardiovascular Surgery, 2006, pp. 1130-1135, 131, No. 5.

Brown et al., "Single port surgery and the Dundee Endocone.", SAGES Annual Scientific Sessions: Emerging Technology Poster Abstracts, 2007, ETP007, pp. 323-324.

Buchowski et al., "Temporary internal distraction as an aid to correction of severe scoliosis", J Bone Joint Surg Am, 2006, pp. 2035-2041, 88-A, No. 9.

Burghardt et al., "Mechanical failure of the Intramedullary Skeletal Kinetic Distractor in limb lengthening.", J Bone Joint Surg Br, 2011, pp. 639-643, 93-B, No. 5.

Burke, "Design of a minimally invasive non fusion device for the surgical management of scoliosis in the skeletally immature", Studies in Health Technology and Informatics, 2006, pp. 378-384, 123.

Carter et al., "A cumulative damage model for bone fracture.", Journal of Orthopaedic Research, 1985, pp. 84-90, 3, No. 1.

Chapman et al., "Laparoscopic adjustable gastric banding in the treatment of obesity: A systematic literature review.", Surgery, 2004, pp. 326-351, 135, No. 3.

Cole et al., "Operative technique intramedullary skeletal kinetic distractor: Tibial surgical technique.", Orthofix, 2005.

Cole et al., "The intramedullary skeletal kinetic distractor (ISKD): first clinical results of a new intramedullary nail for lengthening of the femur and tibia.", Injury, 2001, pp. S-D-129-S-D-139, 32.

Dailey et al., "A novel intramedullary nail for micromotion stimulation of tibial fractures.", Clinical Biomechanics, 2012, pp. 182-188, 27, No. 2.

Daniels et al., "A new method for continuous intraoperative measurement of Harrington rod loading patterns.", Annals of Biomedical Engineering, 1984, pp. 233-246, 12, No. 3.

De Giorgi et al., "Cotrel-Dubousset instrumentation for the treatment of severe scoliosis.", European Spine Journal, 1999, pp. 8-15, No. 1.

Dorsey et al., "The stability of three commercially available implants used in medial opening wedge high tibial osteotomy.", Journal of Knee Surgery, 2006, pp. 95-98, 19, No. 2.

Edeland et al., "Instrumentation for distraction by limited surgery in scoliosis treatment.", Journal of Biomedical Engineering, 1981, pp. 143-146, 3, No. 2.

Elsebaie, "Single growing rods (Review of 21 cases). Changing the foundations: Does it affect the results?", Journal of Child Orthop, 2007, 1:258.

Ember et al., "Distraction forces required during growth rod lengthening.", J of Bone Joint Surg BR, 2006, p. 229, 88-B, No. Suppl. II.

European Patent Office, "Observations by a third party under Article 115 EPC in EP08805612 by Soubeiran.", 2010.

Fabry et al., "A technique for prevention of port complications after laparoscopic adjustable silicone gastric banding.", Obesity Surgery, 2002, pp. 285-288, 12, No. 2.

Fried et al., "In vivo measurements of different gastric band pressures towards the gastric wall at the stoma region.", Obesity Surgery, 2004, p. 914, 14, No. 7.

Gao et al., CHD7 gene polymorphisms are associated with susceptibility to idiopathic scoliosis, American Journal of Human Genetics, 2007, pp. 957-965, 80.

Gebhart et al., "Early clinical experience with a custom made growing endoprosthesis in children with malignant bone tumors of the lower extremity actioned by an external permanent magnet; The Phenix M. system", International Society of Limb Salvage 14th International Symposium on Limb Salvage. Sep. 3, 2007, Hamburg, Germany. (2 pages).

Gillespie et al. "Harrington instrumentation without fusion.", J Bone Joint Surg Br, 1981, p. 461, 63-B, No. 3.

Goodship et al., "Strain rate and timing of stimulation in mechanical modulation of fracture healing.", Clinical Orthopaedics and Related Research, 1998, pp. S105-S115, No. 355S.

Grass et al., "Intermittent distracting rod for correction of high neurologic risk congenital scoliosis.", Spine, 1997, pp. 1922-1927, 22, No. 16.

Gray, "Gray's anatomy of the human body.", http://education.yahoo.com/reference/gray/subjects/subject/128, published Jul. 1, 2007.

Grimer et al. "Non-invasive extendable endoprostheses for children—Expensive but worth it!", International Society of Limb Salvage 14th International Symposium on Limb Salvage, 2007.

Grünert, "The development of a totally implantable electronic sphincter." (translated from the German "Die Entwicklung eines total implantierbaren elektronischen Sphincters"), Langenbecks Archiv fur Chirurgie, 1969, pp. 1170-1174, 325.

Guichet et al. "Gradual femoral lengthening with the Albizzia intramedullary nail", J Bone Joint Surg Am, 2003, pp. 838-848, 85-A, No. 5.

Gupta et al., "Non-invasive distal femoral expandable endoprosthesis for limb-salvage surgery in paediatric tumours.", J Bone Joint Surg Br, 2006, pp. 649-654, 88-B, No. 5.

Hankemeier et al., "Limb lengthening with the Intramedullary Skeletal Kinetic Distractor (ISKD).", Oper Orthop Traumatol, 2005, pp. 79-101, 17, No. 1.

Harrington, "Treatment of scoliosis. Correction and internal fixation by spine instrumentation.", J Bone Joint Surg Am, 1962, pp. 591-610, 44-A, No. 4.

Hennig et al., "The safety and efficacy of a new adjustable plate used for proximal tibial opening wedge osteotomy in the treatment of unicompartmental knee osteoarthrosis.", Journal of Knee Surgery, 2007, pp. 6-14, 20, No. 1.

Hofmeister et al., "Callus distraction with the Albizzia nail.", Practice of Intramedullary Locked Nails, 2006, pp. 211-215.

Horbach et al., "First experiences with the routine use of the Rapid Port™ system with the Lap-Band®.", Obesity Surgery, 2006, p. 418, 16, No. 4.

Hyodo et al., "Bone transport using intramedullary fixation and a single flexible traction cable.", Clinical Orthopaedics and Related Research, 1996, pp. 256-268, 325.

International Commission on Non-Ionizing Radiation Protection, "Guidelines on limits of exposure to static magnetic fields." Health Physics, 2009, pp. 504-514, 96, No. 4.

Invis®/Lamello Catalog, 2006, Article No. 68906A001 GB.

Kasliwal et al., "Management of high-grade spondylolisthesis.", Neurosurgery Clinics of North America, 2013, pp. 275-291, 24, No. 2.

Kenawey et al., "Leg lengthening using intramedullay skeletal kinetic distractor: Results of 57 consecutive applications.", Injury, 2011, pp. 150-155, 42, No. 2.

Kent et al., "Assessment and correction of femoral malrotation following intramedullary nailing of the femur.", Acta Orthop Belg, 2010, pp. 580-584, 76, No. 5.

Klemme et al., "Spinal instrumentation without fusion for progressive scoliosis in young children", Journal of Pediatric Orthopaedics. 1997, pp. 734-742, 17, No. 6.

Korenkov et al., "Port function after laparoscopic adjustable gastric banding for morbid obesity.", Surgical Endoscopy, 2003, pp. 1068-1071, 17, No. 7.

Krieg et al., "Leg lengthening with a motorized nail in adolescents.", Clinical Orthopaedics and Related Research, 2008, pp. 189-197, 466, No. 1.

Kucukkaya et al., "The new intramedullary cable bone transport technique.", Journal of Orthopaedic Trauma, 2009, pp. 531-536, 23, No. 7.

Lechner et al., "In vivo band manometry: A new method in band adjustment", Obesity Surgery, 2005, p. 935, 15, No. 7.

Lechner et al., "Intra-band manometry for band adjustments: The basics", Obesity Surgery, 2006, pp. 417-418, 16, No. 4.

Li et al., "Bone transport over an intramedullary nail: A case report with histologic examination of the regenerated segment.", Injury, 1999, pp. 525-534, 30, No. 8.

(56) References Cited

OTHER PUBLICATIONS

Lonner, "Emerging minimally invasive technologies for the management of scoliosis.", Orthopedic Clinics of North America, 2007, pp. 431-440, 38, No. 3.
Matthews et al., "Magnetically adjustable intraocular lens.", Journal of Cataract and Refractive Surgery, 2003, pp. 2211-2216, 29, No. 11.
Micromotion, "Micro Drive Engineering. General catalogue.", 2009, pp. 14-24.
Mineiro et al., "Subcutaneous rodding for progressive spinal curvatures: Early results.", Journal of Pediatric Orthopaedics, 2002, pp. 290-295, 22, No. 3.
Moe et al., "Harrington instrumentation without fusion plus external orthotic support for the treatment of difficult curvature problems in young children.", Clinical Orthopaedics and Related Research, 1984, pp. 35-45, 185.
Montague et al., "Magnetic gear dynamics for servo control.", Melecon 2010—2010 15th IEEE Mediterranean Electrotechnical Conference, Valletta, 2010, pp. 1192-1197.
Montague et al., "Servo control of magnetic gears.", IEEE/ASME Transactions on Mechatronics, 2012, pp. 269-278, 17, No. 2.
Nachemson et al., "Intravital wireless telemetry of axial forces in Harrington distraction rods in patients with idiopathic scoliosis.", The Journal of Bone and Joint Surgery, 1971, pp. 445-465, 53, No. 3.
Nachlas et al., "The cure of experimental scoliosis by directed growth control.", The Journal of Bone and Joint Surgery, 1951, pp. 24-34, 33-A, No. 1.
Newton et al., "Fusionless scoliosis correction by anterolateral tethering . . . can it work?.", 39th Annual Scoliosis Research Society Meeting, 2004.
Oh et al., "Bone transport over an intramedullary nail for reconstruction of long bone defects in tibia.", Archives of Orthopaedic and Trauma Surgery, 2008, pp. 801-808, 128, No. 8.
Ozcivici et al., "Mechanical signals as anabolic agents in bone.", Nature Reviews Rheumatology, 2010, pp. 50-59, 6, No. 1.
Piorkowski et al., Preventing Port Site Inversion in Laparoscopic Adjustable Gastric Banding, Surgery for Obesity and Related Diseases, 2007, 3(2), pp. 159-162, Elsevier; New York, U.S.A.
Prontes, "Longest bone in body.", eHow.com, 2012.
Rathjen et al., "Clinical and radiographic results after implant removal in idiopathic scoliosis.", Spine, 2007, pp. 2184-2188, 32, No. 20.
Ren et al., "Laparoscopic adjustable gastric banding: Surgical technique", Journal of Laparoendoscopic & Advanced Surgical Techniques, 2003, pp. 257-263, 13, No. 4.
Reyes-Sanchez et al., "External fixation for dynamic correction of severe scoliosis", The Spine Journal, 2005, pp. 418-426, 5, No. 4.
Rinsky et al., "Segmental instrumentation without fusion in children with progressive scoliosis.", Journal of Pediatric Orthopedics, 1985, pp. 687-690, 5, No. 6.
Rode et al., "A simple way to adjust bands under radiologic control", Obesity Surgery, 2006, p. 418, 16, No. 4.
Schmerling et al., "Using the shape recovery of nitinol in the Harrington rod treatment of scoliosis.", Journal of Biomedical Materials Research, 1976, pp. 879-892, 10, No. 6.
Scott et al., "Transgastric, transcolonic and transvaginal cholecystectomy using magnetically anchored instruments.", SAGES Annual Scientific Sessions, Poster Abstracts, Apr. 18-22, 2007, P511, p. 306.
Sharke, "The machinery of life", Mechanical Engineering Magazine, Feb. 2004, Printed from Internet site Oct. 24, 2007 http://www.memagazine.org/contents/current/features/moflife/moflife.html.
Shiha et al., "Ilizarov gradual correction of genu varum deformity in adults.", Acta Orthop Belg, 2009, pp. 784-791, 75, No. 6.
Simpson et al., "Femoral lengthening with the intramedullary skeletal kinetic distractor.", Journal of Bone and Joint Surgery, 2009, pp. 955-961, 91-B, No. 7.
Smith, "The use of growth-sparing instrumentation in pediatric spinal deformity.", Orthopedic Clinics of North America, 2007, pp. 547-552, 38, No. 4.

Soubeiran et al. "The Phenix M System, a fully implanted non-invasive lengthening device externally controllable through the skin with a palm size permanent magnet. Applications in limb salvage." International Society of Limb Salvage 14th International Symposium on Limb Salvage, Sep. 13, 2007, Hamburg, Germany. (2 pages).
Soubeiran et al., "The Phenix M System. A fully implanted lengthening device externally controllable through the skin with a palm size permanent magnet; Applications to pediatric orthopaedics", 6th European Research Conference in Pediatric Orthopaedics, Oct. 6, 2006, Toulouse, France (7 pages).
Stokes et al., "Reducing radiation exposure in early-onset scoliosis surgery patients: Novel use of ultrasonography to measure lengthening in magnetically-controlled growing rods. Prospective validation study and assessment of clinical algorithm", 20th International Meeting on Advanced Spine Techniques, Jul. 11, 2013. Vancouver, Canada. Scoliosis Research Society.
Sun et al., "Masticatory mechanics of a mandibular distraction osteogenesis site: Interfragmentary micromovement.", Bone, 2007, pp. 188-196, 41, No. 2.
Synthes Spine, "VEPTR II. Vertical Expandable Prosthetic Titanium Rib II: Technique Guide.", 2008, 40 pgs.
Synthes Spine, "VEPTR Vertical Expandable Prosthetic Titanium Rib, Patient Guide.", 2005, 26 pgs.
Takaso et al., "New remote-controlled growing-rod spinal instrumentation possibly applicable for scoliosis in young children.", Journal of Orthopaedic Science, 1998, pp. 336-340, 3, No. 6.
Teli et al., "Measurement of forces generated during distraction of growing rods.", Journal of Children's Orthopaedics, 2007, pp. 257-258, 1, No. 4.
Tello, "Harrington instrumentation without arthrodesis and consecutive distraction program for young children with severe spinal deformities: Experience and technical details.", The Orthopedic Clinics of North America, 1994, pp. 333-351, 25, No. 2.
Thaller et al., "Limb lengthening with fully implantable magnetically actuated mechanical nails (Phenix®)—Preliminary results.", Injury, 2014 (E-published Oct. 28, 2013), pp. S60-S65, 45.
Thompson et al., "Early onset scoliosis: Future directions", 2007, J Bone Joint Surg Am, pp. 163-166, 89-A, Suppl 1.
Thompson et al., "Growing rod techniques in early-onset scoliosis", Journal of Pediatric Orthopedics, 2007, pp. 354-361, 27, No. 3.
Thonse et al., "Limb lengthening with a fully implantable, telescopic, intramedullary nail.", Operative Techniques in Orthopedics, 2005, pp. 355-362, 15, No. 4.
Trias et al., "Dynamic loads experienced in correction of idiopathic scoliosis using two types of Harrington rods.", Spine, 1979, pp. 228-235, 4, No. 3.
Verkerke et al., "An extendable modular endoprosthetic system for bone tumor management in the leg", Journal of Biomedical Engineering, 1990, pp. 91-96, 12, No. 2.
Verkerke et al., "Design of a lengthening element for a modular femur endoprosthetic system", Proceedings of the Institution of Mechanical Engineers Part H: Journal of Engineering in Medicine, 1989, pp. 97-102, 203, No. 2.
Verkerke et al., "Development and test of an extendable endoprosthesis for bone reconstruction in the leg.", The International Journal of Artificial Organs, 1994, pp. 155-162, 17, No. 3.
Weiner et al., "Initial clinical experience with telemetrically adjustable gastric banding", Surgical Technology International, 2005, pp. 63-69, 15.
Wenger, "Spine jack operation in the correction of scoliotic deformity: A direct intrathoracic attack to straighten the laterally bent spine: Preliminary report", Arch Surg, 1961, pp. 123-132 (901-910), 83, No. 6.
White, III et al., "The clinical biomechanics of scoliosis.", Clinical Orthopaedics and Related Research, 1976, pp. 100-112, 118.
Yonnet, "A new type of permanent magnet coupling.", IEEE Transactions on Magnetics, 1981, pp. 2991-2993, 17, No. 6.
Yonnet, "Passive magnetic bearings with permanent magnets.", IEEE Transactions on Magnetics, 1978, pp. 803-805, 14, No. 5.
Zheng et al., "Force and torque characteristics for magnetically driven blood pump.", Journal of Magnetism and Magnetic Materials, 2002, pp. 292-302, 241, No. 2.

(56) References Cited

OTHER PUBLICATIONS

International Search Report and Written Opinion of the International Searching Authority, PCT/US2023/022380, pp. 1-12 (Sep. 6, 2023).

* cited by examiner

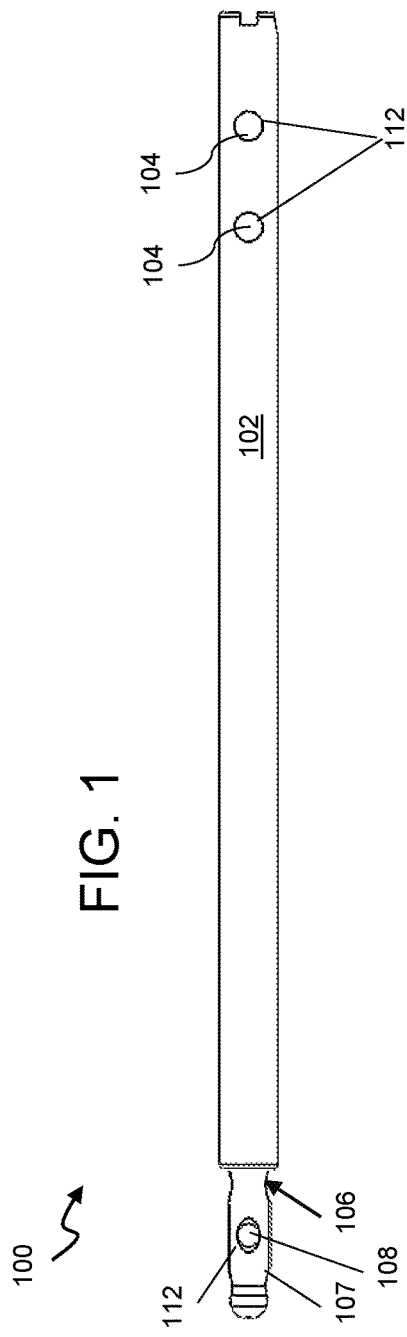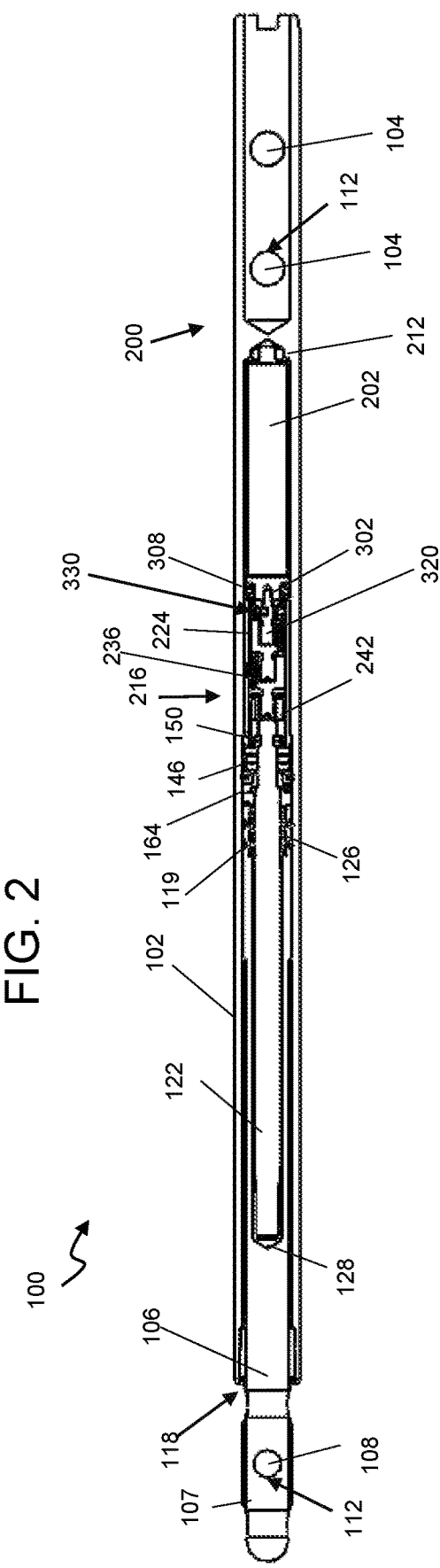

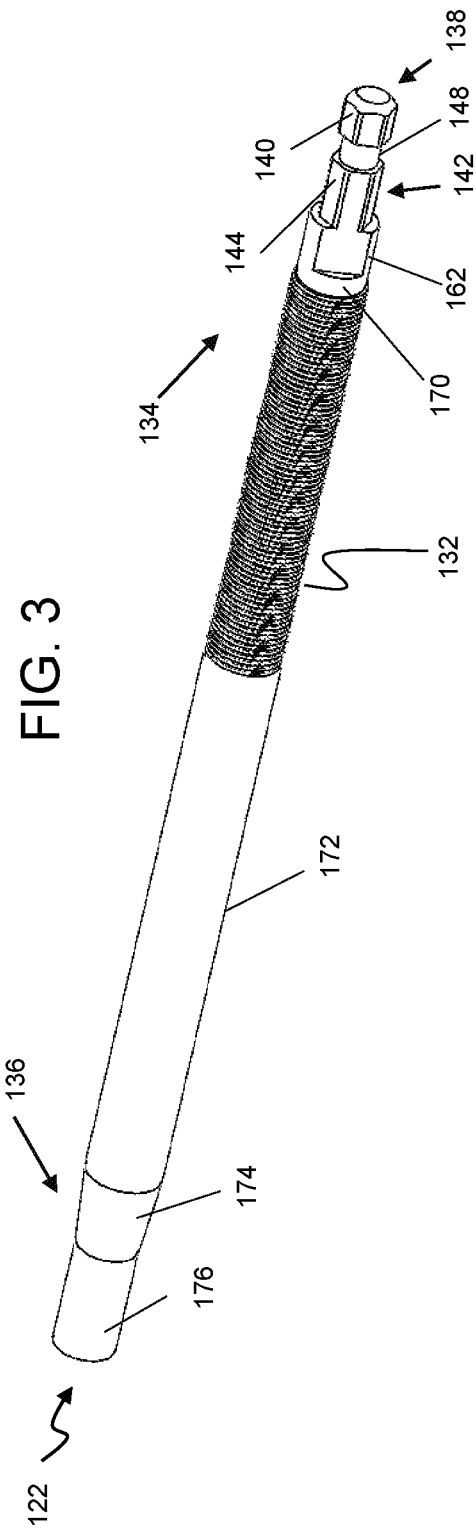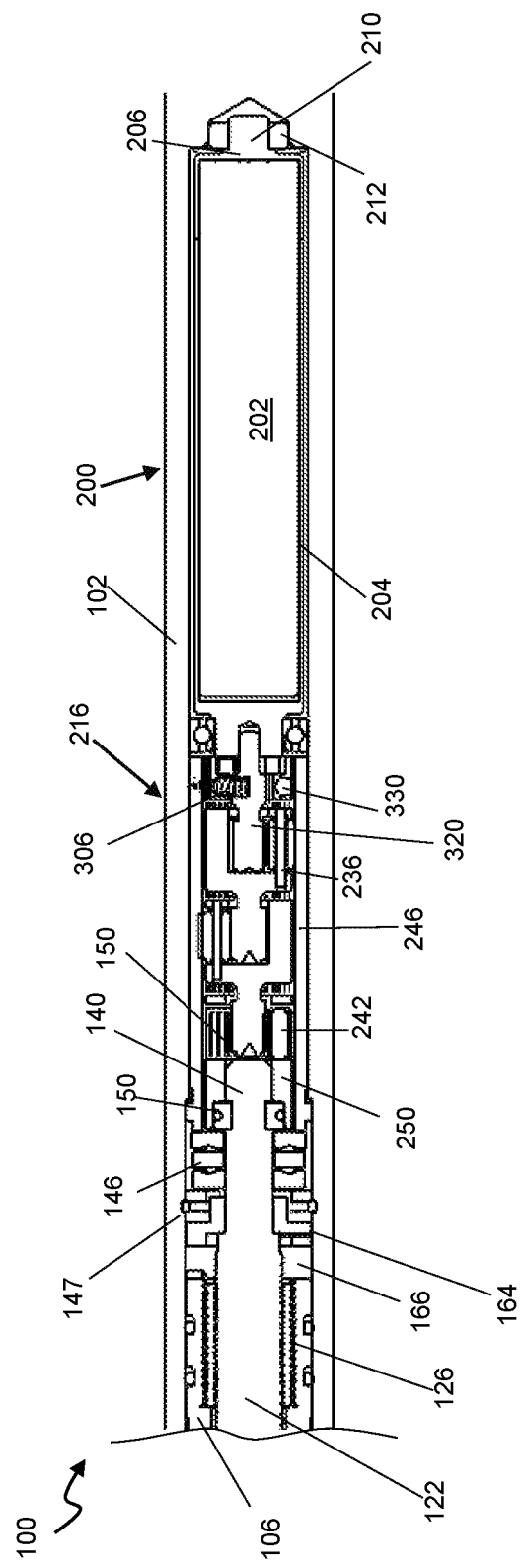

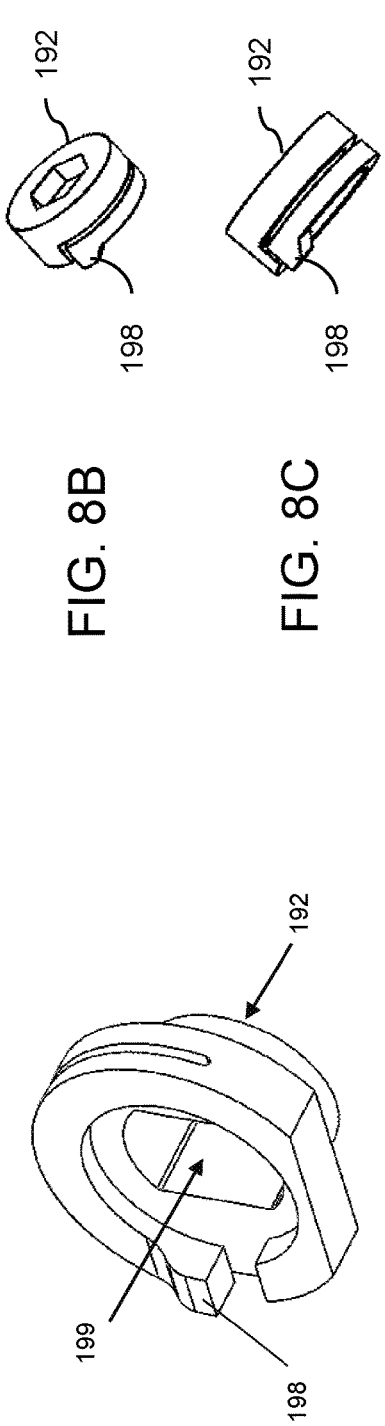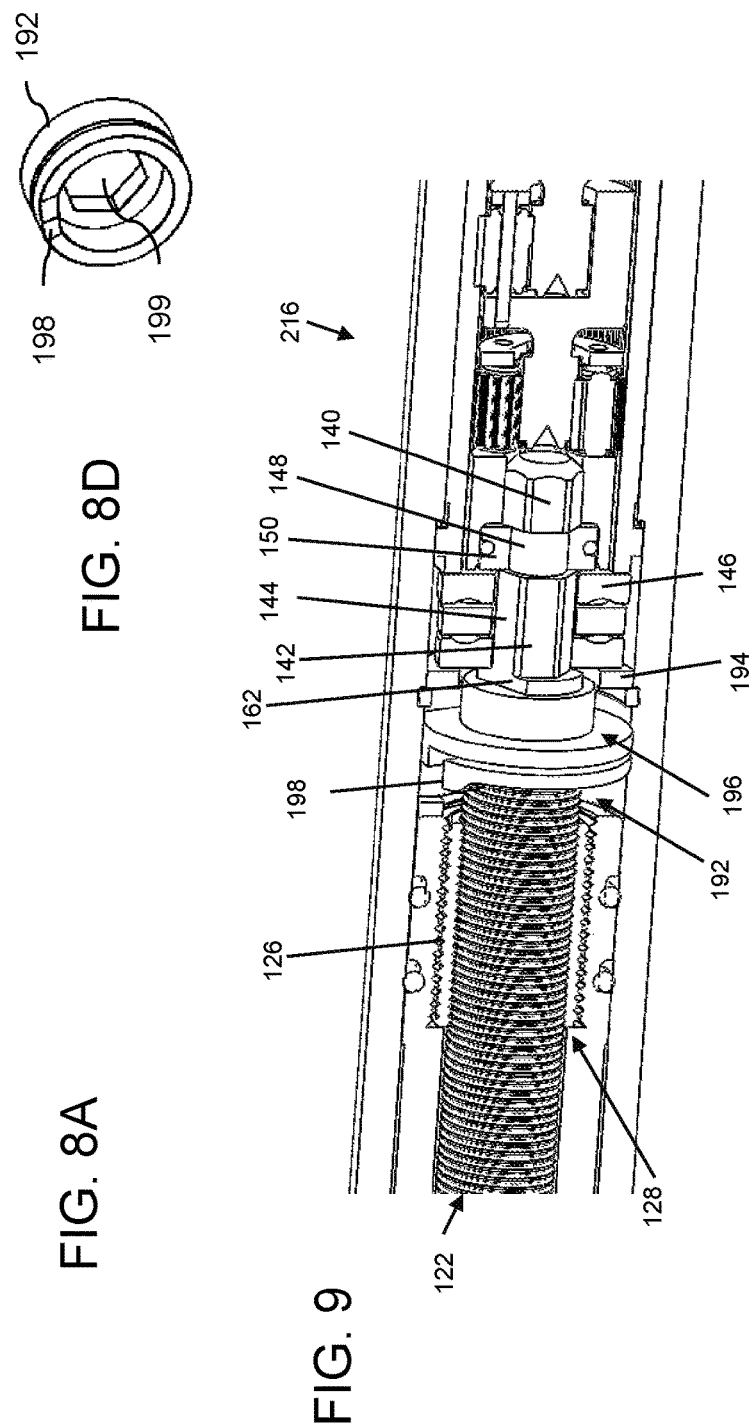

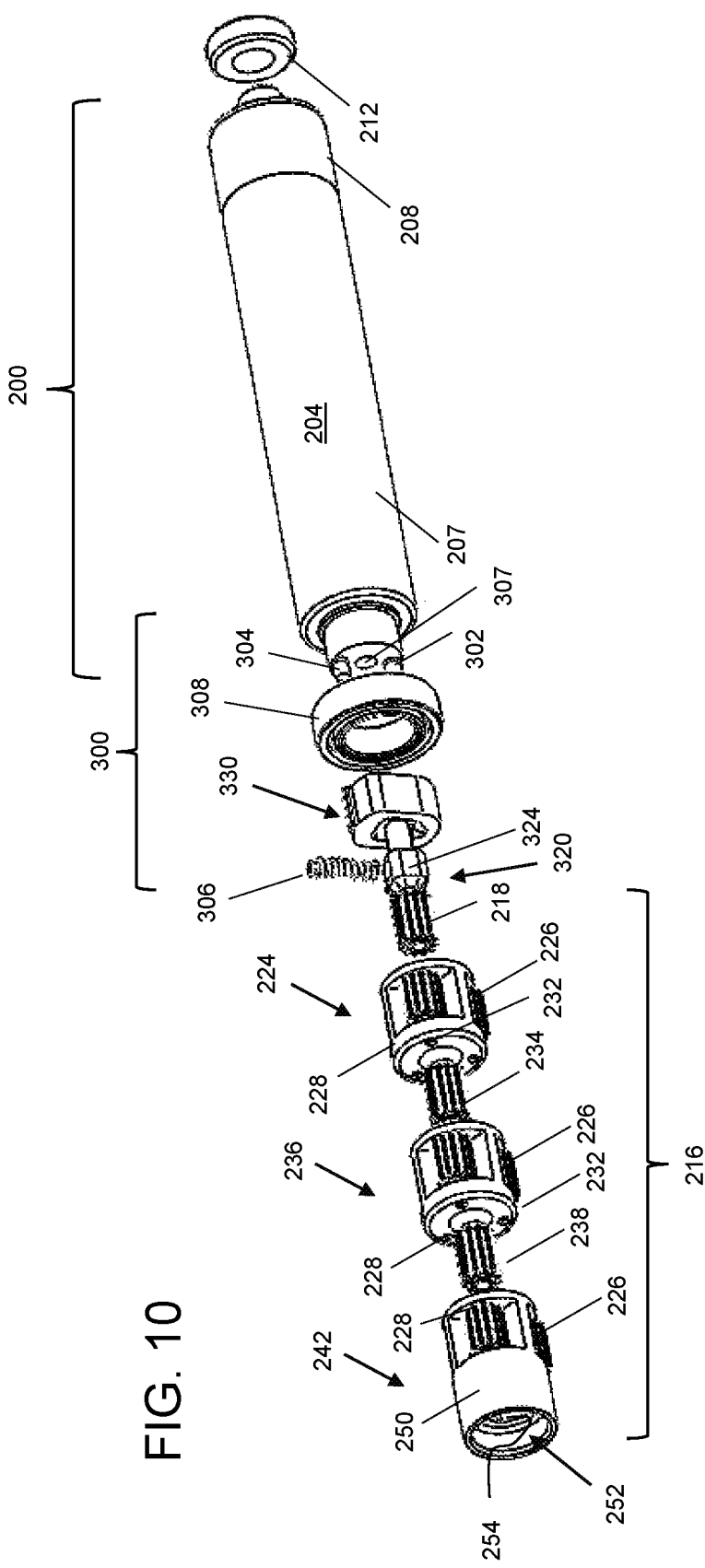

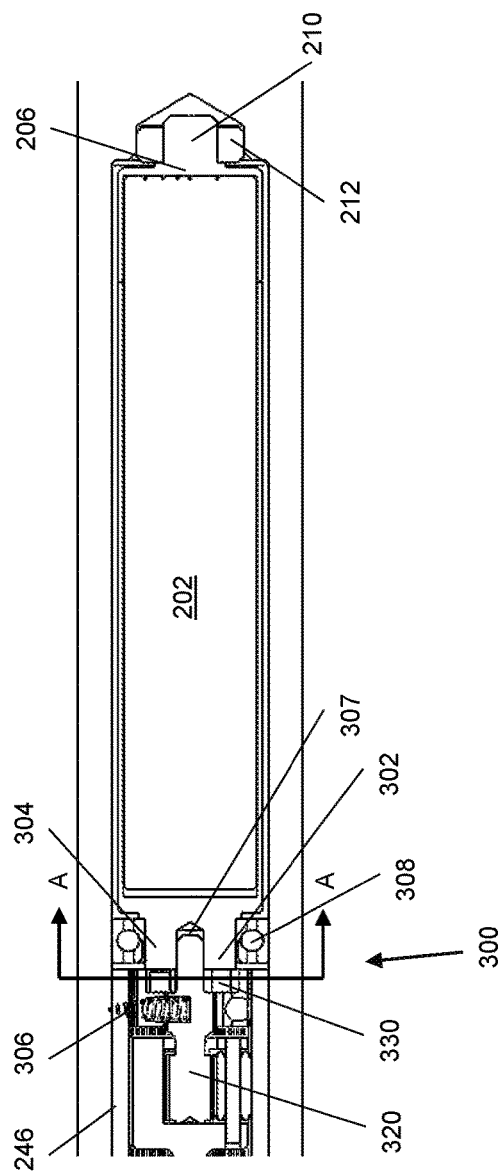
FIG. 20
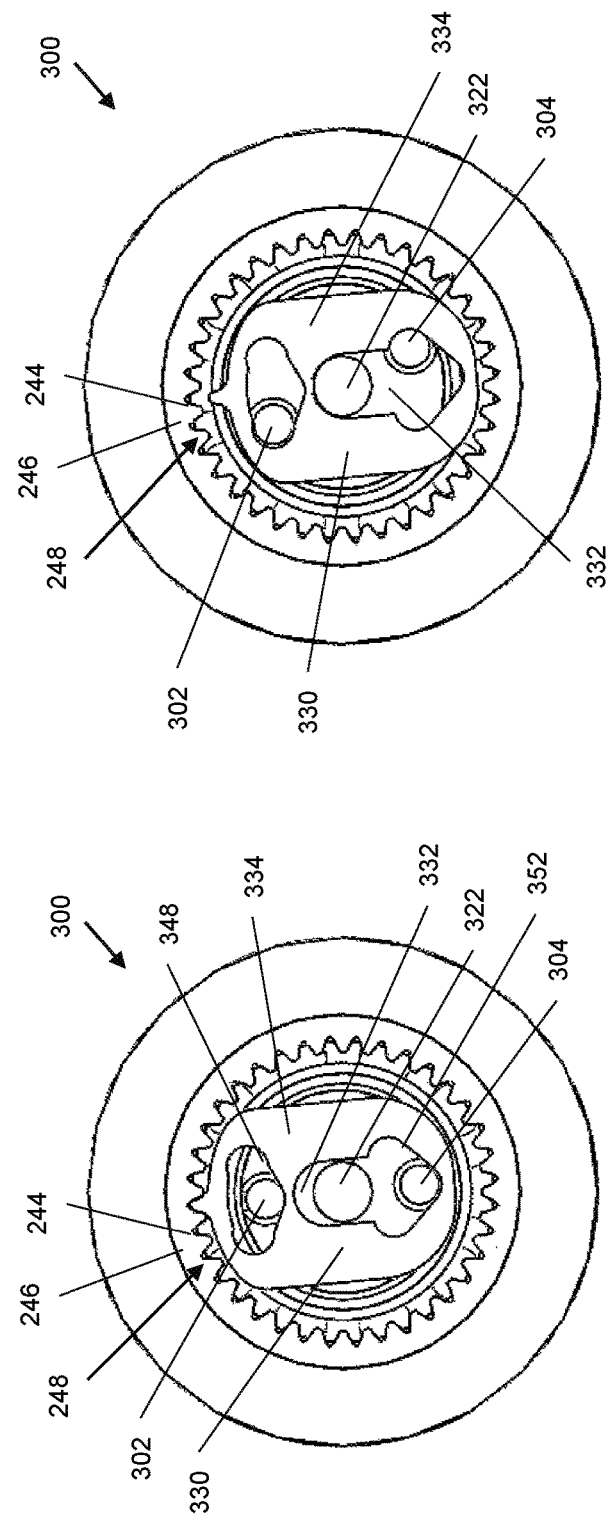
FIG. 22
FIG. 21

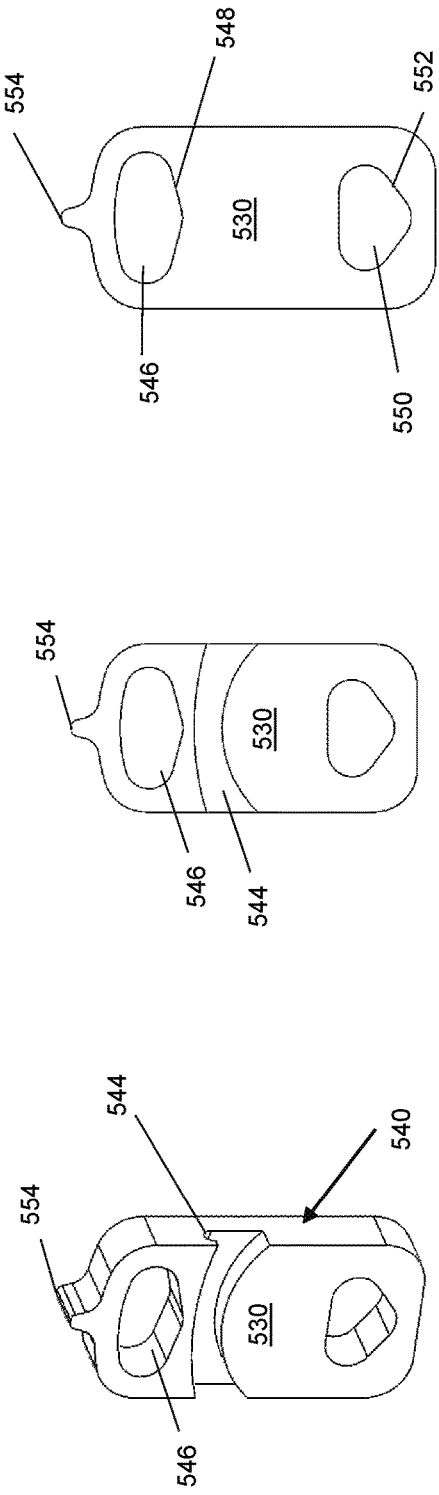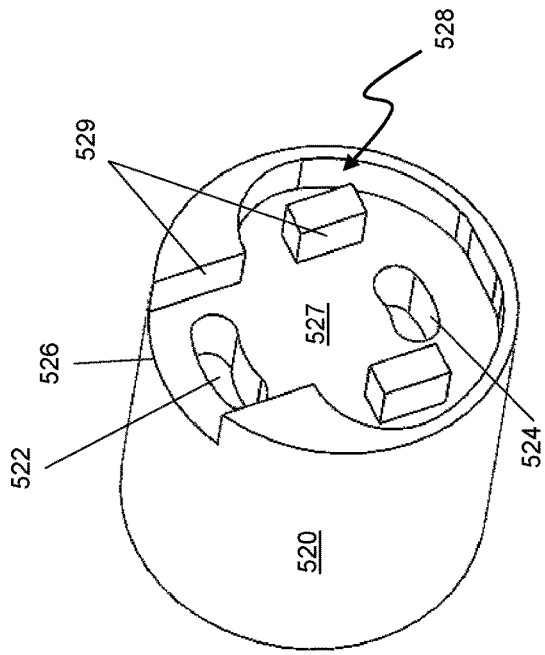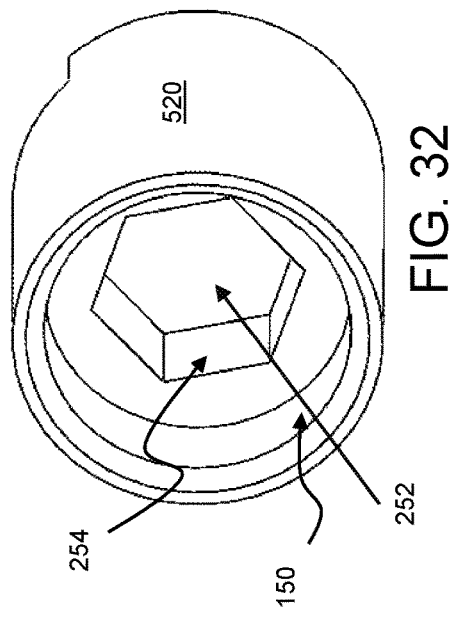

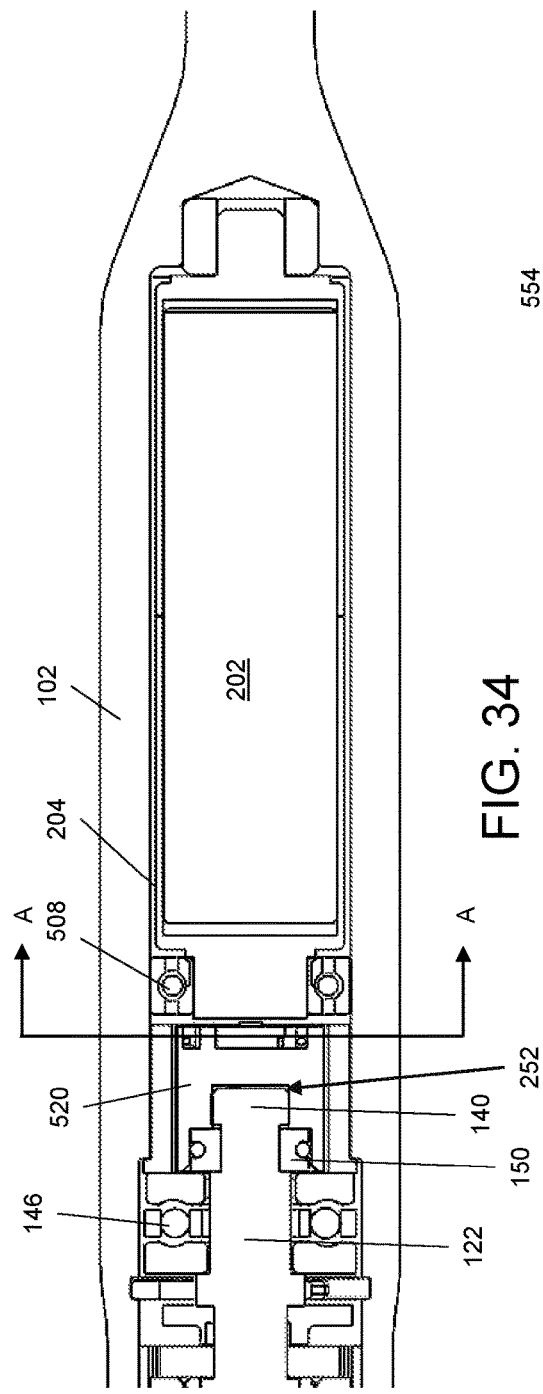
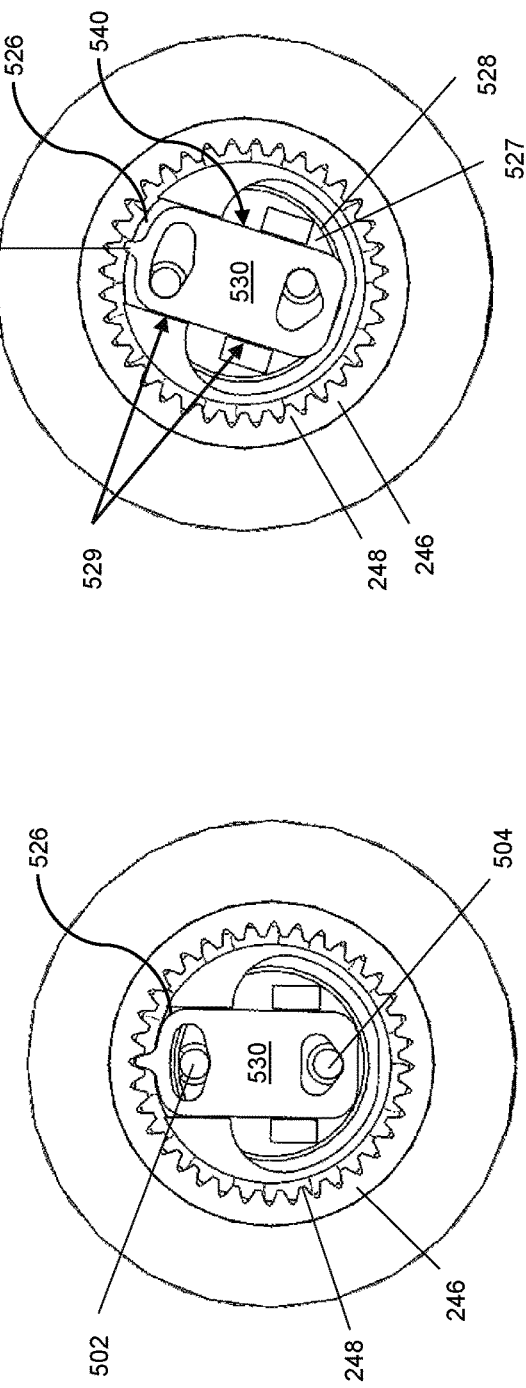
FIG. 34
FIG. 35
FIG. 36

DISTRACTION LOSS MAGNET ON-OFF MECHANISM

FIELD OF THE INVENTION

The invention relates generally to implantable medical devices, and more particularly, to implantable distraction and compression devices, and rotation lock mechanisms for use therein, to prevent distraction or compression loss under load.

BACKGROUND

Distraction osteogenesis is a technique which has been used to grow new bone in patients with a variety of defects. For example, limb lengthening is a technique in which the length of a bone, for example a femur or tibia, may be increased. By creating a corticotomy, or osteotomy in the bone, which is a cut through the bone, the two resulting sections of bone may be moved apart at a particular rate, for example one (1.0) mm per day, allowing new bone to regenerate between the two sections as they move apart. This technique of limb lengthening may be used in cases where one limb is longer than the other, such as a prior bone break that did not heal correctly, or in a patient whose growth plate was diseased or damaged prior to maturity. In some patients, stature lengthening is desired, and is achieved by lengthening both femurs and/or both tibias to increase the height of the patient.

In other clinical applications, treatment of an orthopedic condition may include compressing, retracting, or pulling portions of bone together. For example, in certain compressive applications, it may be desirable to hold or pull two fractured sections of a bone together.

Regardless of whether compression or distraction is performed, implantable compression and distraction devices may be exposed to significant loads placed on the drive features. These loads may undesirably cause back-driving and loss of previously achieved distraction or compression. It is therefore desirable to provide improved implants, systems, and devices which are capable of performing distraction and retraction/compression procedures while avoiding losses due to back-driving of the device under load. Desirably, the improved implants, systems, and devices are resistant to such losses while allowing the device to operate in both forward and reverse, i.e., to perform both distraction and compression, and to do so without compromising the efficiency of the device in the generation of distraction and compression forces.

SUMMARY

A first aspect of the disclosure provides an implantable medical device comprising: a driver; a driven gear system; and a keeper, in which the keeper comprises: a body; a keyed opening in the body; an opening in the body configured to receive a center pin of the drive gear of the driven gear system; and a lock tooth disposed on a first end of the body. According to this aspect, the keyed opening may be configured to receive a complementarily keyed portion of a drive gear of the driven gear system, wherein the keeper and the drive gear are rotationally fixed to one another. The opening in the body may be configured to receive a center pin of the drive gear of the driven gear system, and to permit the body to translate axially relative to the center pin. The lock tooth may be configured to releasably mesh with teeth on a ring gear of the driven gear system. The keeper may be configured to move from a locked position to an unlocked position in response to a rotation of the driver. In the locked position, the keeper is configured to prevent rotation of the drive gear and the driver under a load on the driven gear system, and in the unlocked position, to permit rotation of the drive gear and the driver.

In certain embodiments, the keeper is further configured to rotate to move from the locked position to the unlocked position; to translate axially relative to the center pin in a direction opposite the first end in response to the rotating of the keeper; and to disengage the lock tooth from the ring gear of the driven gear system in response to the translating, thereby moving the keeper to the unlocked position.

In certain embodiments, the keeper further comprises a first face configured to engage the driver, and a second face configured to engage the driven gear system. The opening extends from the first face through the body to the second face, and the keyed opening extends from the second face through a partial thickness of the keeper. In certain embodiments, the opening and the keyed opening are fluidly coupled, wherein the keyed opening is bounded by drive surfaces configured to drive rotation of the keyed portion of the drive gear, and the opening is bounded by shaft relief surfaces configured to permit translation of the center pin. The keeper may further comprise a stepped surface between the drive surfaces and the shaft relief surfaces.

In certain embodiments, the keeper further comprises a first detent disposed on the first face. The first detent is disposed between the opening and the first end of the body, and comprises a first ramp surface. The keeper further comprises a second detent disposed on the first face at a second end thereof, opposite the first end. The second detent comprises a second ramp surface. Each of the first detent and the second detent may be configured to receive a drive pin disposed on an end of the driver.

In certain embodiments, the keeper further comprises a hole disposed in the second end of the body and open to the keyed opening, the hole being configured to receive a biaser. In the locked position, the lock tooth is configured to engage the ring gear, and to maintain such engagement under biasing force from the biaser in an expanded condition. In the unlocked position, the lock tooth is configured to disengage from the ring gear in response to a compression of the biaser upon rotation of the driver and the keeper.

In certain embodiments, the first ramp and the second ramp are each substantially v-shaped, and a zenith of the first ramp, a zenith of the second ramp, and the lock tooth are laterally aligned, such that the drive pins disposed in each of the first detent and the second detent are disposed in the zeniths of the first ramp and the second ramp when the keeper is in the locked position. The drive pins disposed in each of the first detent and the second detent may then move up the respective first ramp and second ramp when the keeper moves into the unlocked position.

In certain embodiments, the first detent and the second detent are further configured to permit rotation of the driver relative to the keeper to an extent limited by a length of the first ramp and the second ramp.

In certain embodiments, the first detent and the second detent each extend through a partial thickness of the keeper.

A second aspect of the disclosure provides a lock mechanism configured for locking and unlocking rotation of a driver and a driven gear system in an implantable distraction and compression system. The lock mechanism comprises: a driver of rotational motion, comprising a first drive pin and a second drive pin each extending axially from a first end of the driver; a drive gear configured to be driven by the driver, the drive gear comprising a keyed portion, and a keeper disposed over the drive gear and configured to move between a locked position and an unlocked position. The keeper comprises a keyed opening configured to rotatably engage the keyed portion of the keyed drive shaft, a lock tooth disposed on a first end of the keeper, the lock tooth being configured to releasably engage a ring gear of the driven gear system, a first detent and a second detent configured to engage the first drive pin and the second drive pin, and a biaser configured to bias the keeper across a longitudinal axis of the driver and the drive gear. In the locked position, the keeper resists rotation of the drive gear and the driver under a load on the driven gear system. In the unlocked position, the keeper permits rotation of the drive gear and the driver.

In certain embodiments, in the locked position, the biaser is configured to bias the keeper and the lock tooth into meshed engagement with the ring gear, and in the unlocked position, the biaser is configured to be compressed by the keeper upon rotation of the driver, thereby releasing engagement between the lock tooth and the ring gear and permitting the driver and the drive shaft to rotate.

In certain embodiments, the driver further comprises a central recess open to the first end of the driver, and disposed between the first drive pin and the second drive pin. The drive gear further comprises a central pin and a gear, each coupled to the keyed portion of the drive gear at opposing ends thereof. The central pin may be disposed at least partly within the central recess of the driver.

In certain embodiments, the lock mechanism further comprises a hole extending from the keyed opening through the second end of the keeper, and into the keyed portion, wherein the second end is opposite the first end, and wherein the biaser is disposed within the hole.

In certain embodiments, the lock mechanism further comprises a radial bearing configured to maintain a coaxial relationship between two or more of the driver, the keeper, and the keyed drive gear.

In certain embodiments, each of the first and the second detents comprise a ramp surface along which the respective drive pin is configured to travel.

In certain embodiments, the driver comprises a cylindrical permanent magnet configured to be rotated by the application of a magnetic field, and a magnet housing disposed about the cylindrical permanent magnet.

In certain embodiments, the gear is a sun gear, the driven gear system is a planetary gear system, and the sun gear is configured to engage the ring gear via a plurality of planetary gears.

In certain embodiments, the keyed portion has a square cross-sectional shape, and the keyed opening has a corresponding and complementary square cross-sectional shape.

A third aspect of the disclosure provides an implantable distraction and compression system comprising: a housing configured to be attached to a first bone portion, the housing having a driver, a driven gear system, and a lead screw positioned therein, wherein the lead screw is coupled to the driver via the driven gear system such that rotation of the driver causes rotation of the lead screw; a rod configured to be attached to a second bone portion and configured to interact with the lead screw such that, upon rotation of the lead screw, the rod distracts or contracts relative to the housing; and a lock mechanism configured to lock and unlock rotation of the driver and the driven gear system. The lock mechanism comprises a drive gear configured to be driven by the driver, and to input torque into the driven gear system, the drive gear comprising a keyed portion, and a keeper engaged with the driver and with the keyed portion to move between a locked position and an unlocked position in response to rotation of the driver. In the locked position, the keeper resists rotation of the drive gear and the driver under a load on the lead screw, and in the unlocked position, the keeper permits rotation of the drive gear and the driver.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

FIG. 1 shows a top view of an exemplary distraction and compression device in accordance with an embodiment of the invention.

FIG. 2 shows a cross-sectional top view of a distraction and compression device in accordance with an embodiment of the invention.

FIG. 3 shows a perspective view of a lead screw in accordance with an embodiment of the invention.

FIG. 4 shows a cross-sectional view of a portion of a distraction and compression device in accordance with an embodiment of the invention.

FIGS. 8A-8D show enlarged perspective views of an anti-jam spring, as deployed in at least the embodiment of FIG. 9, according to embodiments of the invention.

FIG. 9 shows a cross-sectional view of a portion of an exemplary distraction and compression device including a lock mechanism in accordance with embodiments of the invention.

FIG. 10 shows an exploded perspective view of a gear assembly, a magnet assembly, and a magnet lock mechanism in accordance with an embodiment of the invention.

FIG. 11 shows an enlarged perspective view of the magnet housing of FIG. 10, in accordance with an embodiment of the invention.

FIG. 20 shows a cross sectional view of a portion of an exemplary distraction and compression device including a lock mechanism in accordance with an embodiment of the invention.

FIGS. 21 and 22 show cross-sectional views taken along line A-A of FIG. 20, in which FIG. 21 depicts the locked position and FIG. 22 depicts the unlocked position, in accordance with embodiments of the invention.

FIGS. 29-31 show perspective, front, and back views of a keeper as deployed in the lock mechanism of at least FIG. 27, in accordance with embodiments of the invention.

FIGS. 32-33 show perspective views of a keyed drive output as deployed in the lock mechanism of at least FIG. 27, in accordance with embodiments of the invention.

FIG. 34 shows a cross sectional view of a portion of an exemplary distraction and compression device including a lock mechanism in accordance with an embodiment of the invention.

FIGS. 35 and 36 show cross-sectional views taken along line A-A of FIG. 34, in which FIG. 35 depicts the locked position and FIG. 36 depicts the unlocked position, in accordance with embodiments of the invention.

Figure 6:
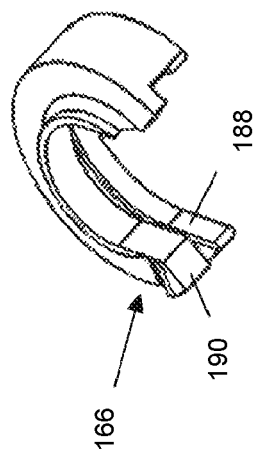
FIGS. 6-7 show enlarged perspective views of an anti-jam ring and an anti-jam retainer, respectively, as deployed in the embodiments of FIGS. 2 and 4, among others, according to embodiments of the invention.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

As indicated above, aspects of the invention provide various embodiments of distraction and compression implants, including intramedullary, extramedullary, and spinal distraction implants, as well as methods and devices for preventing distraction or compression loss in such devices. Such implants, methods, and devices may provide improvements over prior implants, methods, and devices. For example, the presently disclosed implants, methods, and devices may be relevant to performing distraction and retraction/compression procedures while avoiding losses due to back-driving of the device under load, while avoiding, limiting, or preventing reductions in efficiency in the generation of distraction forces.

With reference to FIGS. 1-2, the present disclosure describes various embodiments of a distraction and compression device 100. As noted, the device 100 may be, for example, an extramedullary limb lengthening device, an intramedullary limb lengthening device, or a spinal distraction device. FIGS. 1 and 2 show a top view and a cross-sectional view, respectively, of an exemplary distraction and compression device 100 according to embodiments of the disclosure. As shown, the device 100 includes a housing 102 having at least one fixation aperture 104 and a distraction and compression rod 106 having at least one fixation aperture 108. Specifically, the rod 106 may terminate at a plate 107 having fixation apertures 108 therein. In certain embodiments, the plate 107 may be curved or angled in any of a number of different configurations depending on the location on the bone and the particular bone to which the device 100 is to be affixed, such that the plate 107 may be contoured to conform to a shape of the bone. Further, fixation apertures 104 may be positioned about a plate or bulge portion of the housing 102. At least one fixation aperture 104, 108 may particularly be a locking screw hole having internal threads 112 for engaging a thread disposed on a head of a fixation screw in a manner that will be readily understood by one of skill in the art. In some embodiments, all fixation apertures 104, 108 include internal threads 112.

The housing 102 is configured to be fixed to a bone at a first location and the rod 106 is configured to be fixed to the bone at a second location. In the context of limb lengthening, for example, in order to grow or lengthen bone, the bone may either have a pre-existing separation or may be purposely cut or broken (e.g., via an osteotomy) to create this separation, dividing the bone into a first section and a second section. The cut may be done prior to implanting and securing the device 100 or may be done after the device 100 is implanted, for example by use of a flexible Gigli saw. The rod 106 is configured to contract (e.g., for compression) and/or distract (e.g., for limb lengthening) relative to the housing 102. The device 100 is configured to allow controlled, precise translation of the rod 106 relative to the housing 102 by non-invasive remote control, and thus controlled, precise translation of the bone segment that is secured to the rod 106 relative to the bone segment that is secured to the housing 102.

Over the treatment period, for example for limb lengthening, the bone may be regularly distracted, creating a new separation, within which osteogenesis can occur. The term "regularly distracted" is meant to indicate that distraction occurs on a regular or periodic basis which may be on the order of, e.g., every day or every few days. An exemplary distraction rate may be one millimeter per day, although other distraction rates may be employed. That is to say, a typical distraction regimen may include a daily increase in the length of the device 100 by about one millimeter. This may be done, for example, by four lengthening periods per day, each having 0.25 mm of lengthening. The device 100 as disclosed herein includes a drive system which may be, for example, magnet-driven. The drive system allows the rod 106 to be telescopically extended from the housing 102, thus forcing the first section and the second section of the bone apart from one another.

As shown in FIG. 2, at one end, the housing 102 has an opening 118 for receiving the rod 106. The end of housing 102 which includes the opening 118 may be considered the distal end of housing 102. One or more o-rings 119 may be positioned about the rod 106, between the rod 106 and the housing 102. In some embodiments, a portion of the outer surface of the rod 106 and/or a portion of an internal surface of the housing 102 may be recessed to accommodate the o-ring(s) 119. The o-ring(s) 119 may facilitate proper sealing between the housing 102 and the rod 106 so that bodily fluid does not enter the housing 102 when the device 100 is implanted. The housing 102 is sealably closed at the end opposite opening 118, which may be referred to as the proximal end, by the attachment of an end cap. The end cap may be attached to the housing 102 by means of welding, adhesive bonding or other joining techniques. Further, another o-ring(s) may be provided between the end cap and the housing 102 to provide a seal therebetween.

With reference to FIGS. 2-4, in use, the rod 106 is driven from the housing 102 by means of a lead screw 122 which turns inside a nut 126 that is secured to an inner surface of a cavity 128 in the rod 106 in which the lead screw 122 is disposed. The nut 126 is positioned between the lead screw 122 and the rod 106. The lead screw 122 is mechanically coupled in an indirect or direct manner, to a driver. The driver may be, for example, a cylindrical permanent magnet 202 contained within the housing 102, although in other embodiments, the driver may be, for example, a motor or other actuator as would be readily understood by one of skill in the art. The driver may be mechanically coupled to the lead screw 122 by a driven gear system as described further herein. In any event, rotation of the driver effectuates rotation of the lead screw 122, which translates into axial movement of the rod 106 relative to the housing 102. In embodiments in which the driver is a cylindrical permanent magnet 202, the rotation may be magnetically driven by an external adjustment device 400 (FIGS. 23-25), As shown in FIG. 3, the lead screw 122 includes a shaft 132 having a first end 134 and a second end 136. The first end 134 of the shaft 132 is configured to be coupled with the magnetic assembly 200 (see FIGS. 2 and 4). The first end 134 may include a first end portion 138 having an external keyed surface 140, which may for example be a hex shape, and a second portion 142 having an external keyed surface 144, which may for example be a hex shape. The first end portion 138 is configured to be engaged within an opening 252 (see FIG. of the drive stage 250 (see FIGS. 4 and 10) of gear assembly 216 (FIGS. 2, 4, and 10) as will be described herein. The second portion 142 having the external keyed surface 144 is configured to be engaged with at least one thrust bearing 146 (see FIGS. 2, and 4, with two shown in FIG. 4) positioned adjacent to at least one retainer clip 150 (see for example FIGS. 2, 4, and 5, with two shown in FIG. 4). The thrust bearings 146 each consist of two separate races with ball bearings disposed between the two races. The thrust bearings 146 are configured to transmit high compressive forces during rotation of the lead screw 122 and axial movement of the rod 106 relative thereto. Further, as best seen in FIG. 4, the housing 102 may include a retainer 147 to serve as an abutment surface for the thrust bearings 146.

Returning to FIG. 3, between the two keyed surfaces 138, 142, the lead screw 122 is recessed to provide a smaller diameter portion 148. The smaller diameter portion 148 is sized and shaped to accommodate and/or engage with a retainer clip 150 (see FIGS. 4-5) such that the retainer clip 150 is disposed within the recess defined by the smaller diameter portion 148 between first and second keyed portions 138, 142.

Figure 5:
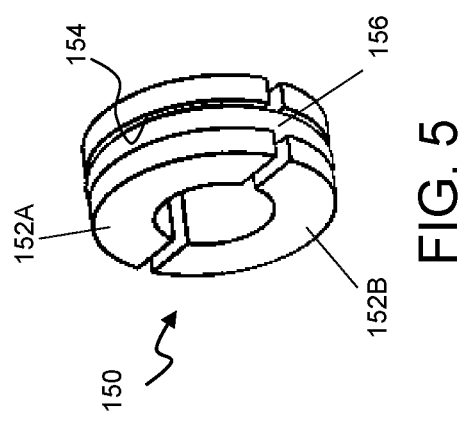
FIG. 5 shows an enlarged perspective view of a retainer clip as deployed in the embodiments of FIGS. 2 and 4, among others, according to embodiments of the invention.

FIG. 5 shows an enlarged view of the retainer clip 150. As shown, the retainer clip 150 includes two separate arcuate members 152A, 152B. Alternatively, the retainer clip 150 may include a single, unitary substantially cylindrical member structure. Arcuate or cylindrical members 152A, 152B may include a recess 154 disposed on a radially outer surface thereof, for seating of an o-ring 156 within the recess 154. The lead screw 122 is recessed on an opposing side of the second portion 142 from the smaller diameter portion 148 to provide another smaller diameter portion 162. Like portion 148, this portion 162 is also sized and shaped to accommodate and/or engage with a retainer clip 150 such that the retainer clip 150 is disposed within the recess defined by the smaller diameter portion 162. Further, the retainer clips 150 together with the retainer 147 of the housing 102 provide support for the thrust bearings 146 due to the retainer clips 150 being positioned about the lead screw 122 on opposing sides of the thrust bearings 146.

The lead screw 122 also includes a step 170 from the smaller diameter portion 162 to a larger diameter portion 172 (see FIG. 3). This larger diameter portion 172 is threaded along at least a portion of the axial extent thereof. In use, the threaded portion of larger diameter portion 172 is at least partially surrounded by the nut 126 (FIGS. 2 and 4) disposed within the cavity 128 within the rod 106 to facilitate axial movement of the rod 106 relative to the housing 102. The second end 136 of the lead screw 122 includes a ramp 174 that transitions from the larger diameter portion 172 to an intermediary diameter portion 176. The intermediary diameter portion 176 does not contain any threads thereon, so as the rod 106 engages this region of the lead screw 122, no additional movement of the rod 106 will be created. In certain embodiments, a stop (not shown) may be disposed on an end of intermediary portion 176 opposite ramp 174, the stop being configured to resist or prevent the rod 106 from disengaging from the lead screw 122 completely. The intermediary diameter portion 176 can be of a diameter smaller than the larger diameter portion 172 and larger than the small diameter portions 148, 162. However, it is also contemplated that the intermediary diameter portion 176 is of the same dimension as the smaller diameter portions 148, 162 or the larger diameter portions 172.

The device 100 may also include an anti-jam feature configured to prevent the rod 106 from jamming or stalling in a fully retracted state. Specifically, the anti-jam feature provides a spring force to overcome the friction force of the rod 106 in a scenario where the rod 106 jams or stalls.

Figure 7:
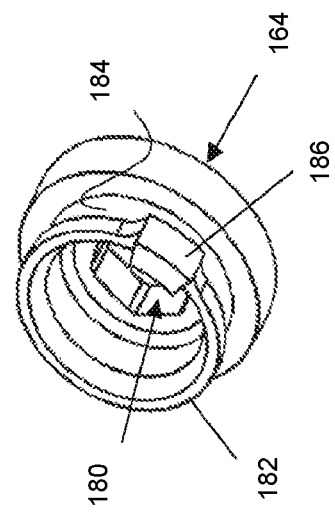

In one embodiment, shown in FIGS. 4 and 6-7, the anti-jam feature may include a substantially circular anti-jam retainer 164 and an anti-jam ring 166 coupled thereto. The anti-jam ring 166 may be, for example, semi-circular or partially-circular. The anti-jam retainer 164 includes an opening 180 having a keyed shape, for example a hex shape, to complement the keyed shape 144 of the lead screw 122 at portion 142. This allows the anti-jam retainer 164 to be rotationally fixed relative to the lead screw 122, and therefore, as the lead screw 122 rotates, the anti-jam retainer 164 rotates with the lead screw 122. The anti-jam retainer 164 also includes a collar 182 for substantially surrounding the retainer clip 150 and maintaining a position of the retainer clip 150 relative to the lead screw 122. As shown, the internal surface of the collar 182 is substantially circular and does not have a keyed shape as in the opening 180. The collar 182 includes a groove 184 formed in an outer surface thereof. The collar 182 also includes a tab and/or projection 186 extending radially and axially therefrom. The anti-jam ring 166 is may include a flange 188 configured to be received within the groove 184 of the anti-jam retainer 164. The flange 188 has a width less than a width of the groove 184 such that slight axial movement of the flange 188 within the groove 184 is allowed, which therefore allows slight axial movement of the anti-jam ring 166 relative to the anti-jam retainer 164. The configuration of the flange 188 and the groove 184 maintains the coupling of the anti-jam ring 166 with the anti-jam retainer 164, while allowing the anti-jam ring 166 and the anti-jam retainer 164 to move rotationally and axially relative to each other. In addition, the anti-jam ring 166 includes a tab and/or a projection 190 extending axially and radially therefrom.

In another embodiment, shown in FIGS. 8A-8D and 9, the anti-jam feature described herein may be in the form of an anti-jam spring 192, which may be a one-piece helical spring as illustrated in FIGS. 8A-8D and 9, having a substantially round or oblong outer cross-sectional shape. In embodiments including an anti-jam spring 192, the distraction rod 106 may include a first tab protrusion 194 extending from a shoulder 196 adjacent an open end of the internal cavity 128 of the distraction shaft 106. The tab protrusion 194 is configured to cooperate with the anti-jam spring 192 as described herein.

The anti-jam spring 192 may include a second tab protrusion 198 configured to matingly engage the first tab protrusion 194 on the distraction shaft 106. Anti-jam spring 192 may further include a keyed opening 199 (see FIG. 8D) which may be, e.g., hexagonally shaped. The shape of keyed opening 199 is configured to complement a cross sectional shape of lead screw 122 at smaller diameter portion 162 (FIG. 9). In this manner, the anti-jam spring 192 is configured to be rotationally fixed to the lead screw 122. This configuration enables the anti-jam spring 192 to stay on-center relative to the lead screw assembly without tilting or floating, and remain constrained in a lead screw shoulder position. In use, when the anti-jam spring 192 is rotated by the lead screw 122, the tab 198 meets and engages the distraction rod tab 194. The resistance provided by the distraction rod tab 194 causes the anti-jam spring 192 to open into the inner diameter of housing 102, and provide the spring force to overcome surface friction as described above. The anti-jam spring 192 is further configured to maintain engagement and face contact with the shoulder 196 of the distraction rod 106 during full retraction of the distraction rod 106.

Regardless of the specific embodiment, the anti-jam feature serves to prevent the rod 106 from jamming or stalling in a fully retracted state. Specifically, in a jammed state, the external adjustment device 400 causes the lead screw 122 (via the magnet 202, shown in FIG. 4) to rotate but the rod 106 may not move axially due to being jammed. For example, a rod 106 may become jammed in a fully retracted state due to frictional forces in the retracted state. Therefore, a torque greater than a torque provided by the external adjustment device 400 (see FIGS. 23-25) may be needed to jumpstart or overcome the frictional forces in a jammed state. As a result, the anti-jam feature provides a built-in mechanism within the device 100 to provide an additional force above and beyond that which is provided by the external adjustment device 400, thereby providing such a jumpstart force.

Referring back to FIG. 4, a rotatable magnetic assembly 200 is located within the housing 102. The magnetic assembly 200 includes a cylindrical, radially-poled permanent magnet 202 contained within a magnet housing 204 having an end cap 206. The permanent magnet 202 may include rare earth magnet materials, such as Neodymium-Iron-Boron. The permanent magnet 202 may further have a protective Phenolic coating thereon, and may be held statically within the magnet housing 204 and end cap 206 by epoxy or other adhesive. The magnet housing 204, end cap 206 and epoxy form a seal to further protect the permanent magnet 202. The magnet housing 204 may also be welded to the end cap 206 to create a hermetic seal. To aid in manufacturing and assembly, the magnet housing 204 may include separate magnet cups 207, 208 (see FIG. 7) for housing the permanent magnet 202 therein. The end cap 206 includes a cylindrical extension or axle 210 which fits within the inner diameter of a radial bearing 212, allowing for low friction rotation.

Figure 13:
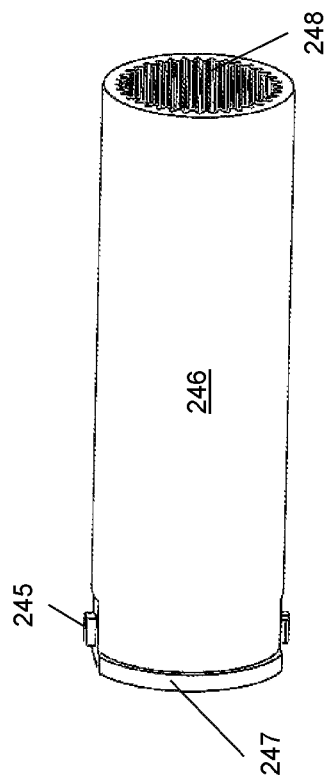
FIGS. 12-13 show perspective views of a ring gear in accordance with an embodiment of the invention.
Figure 12:
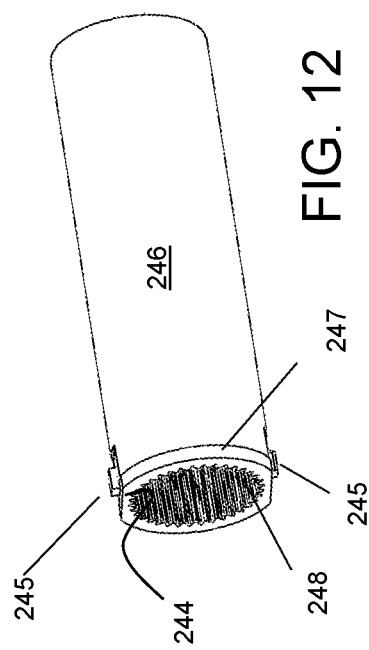

As shown in at least FIGS. 2, 4, 9, and 10, the magnetic assembly 200 may be coupled to a gear assembly 216, which in turn is configured to couple the lead screw 122 to the magnet assembly 200. Referring to FIG. 10, the magnetic assembly 200 may terminate with a first sun gear 218. The first sun gear 218 turns in a 1:1 fashion in response to rotation of the magnetic assembly 200, upon application of a moving magnetic field applied to the patient from an external location. The first sun gear 218 is configured to insert within an opening of a first gear stage 224 having three planetary gears 226 which are rotatably held in a frame 228 by axles 232. A second sun gear 234, which is the output of the first gear stage 224, turns with frame 228. The identical components exist in second gear stage 236, which outputs to a third sun gear 238, and third gear stage 242, which terminates in a drive stage 250. The drive stage 250 is positioned about the gear assembly 216 furthest from the magnet assembly 200. Along the length that the gear stages 224, 236, 242 extend, the inner wall 244 of a ring gear 246 (as seen in FIGS. 12-13) has internal teeth 248 along which the externally extending teeth of the planetary gears 226 engage as they turn. Each gear stage illustrated has a 4:1 gear ratio, so the drive stage 250 turns once for every 64 turns of the magnetic assembly 200.

The frame 228 of the third gear stage 242 includes the drive stage 250. The drive stage 250 includes an opening 252 having a keyed internal surface 254. The keyed internal surface 254 is configured to matingly engage with a keyed external surface 140 of the end 134 of the lead screw 122 (see FIG. 3). The engagement of the keyed surfaces 254, 140 prevent rotation of lead screw 122 and the drive stage 250 relative to each other. The keyed surfaces 254, 140 may be, for example, female and male hex shapes, respectively. However, other shapes that prevent rotation of the lead screw 122 relative to the drive stage 250 are also contemplated by the disclosure. To further maintain the lead screw 122 within the drive stage 250, a first retainer clip 150 may be provided within the opening 252 of the drive stage 250 and at least partially surrounding the lead screw 122 proximal to the keyed external surface 140. Specifically, the retainer clip 150 may be positioned about the smaller diameter portion 148 (see FIG. 3) within the opening 252.

The torque applied on the magnetic assembly 200 by the action of the rotating magnetic field on the cylindrical permanent magnet 202, is therefore augmented on the order of 64 times in terms of the turning torque of the lead screw 122. This allows the rod 106 to be able to move with high precision. Because of the 64:1 gear ratio, the device 100 is able to axially displace the bone segment coupled to the rod 106 against severe resisting forces, for example those created by soft tissue.

As shown in FIGS. 2, 4, and 9, one or more thrust bearings 146 serve to protect the magnet assembly 200 and the gear assembly 216 from any significant compressive or tensile stresses. When there is a compressive force on the device, for example, when distracting a bone, and thus resisting the tensile strength of the soft tissues, the thrust bearing(s) 146 abuts against retainer clip(s) 150 and/or retainer 147. In other embodiments, the device 100 is used for pulling bones together. For example, in certain compressive applications, it is the goal to hold two fractured sections of a bone together. In these compressive applications, the device 100 may be under a tensile force and the thrust bearing(s) 146 would abut against the retainer clip(s) 150 or retainer 147. In both situations, the thrust bearings 146 and the retainer 147 absorb the large stresses, rather than the magnet assembly 200 or gear assembly 216 of the drive system.

Figure 14:
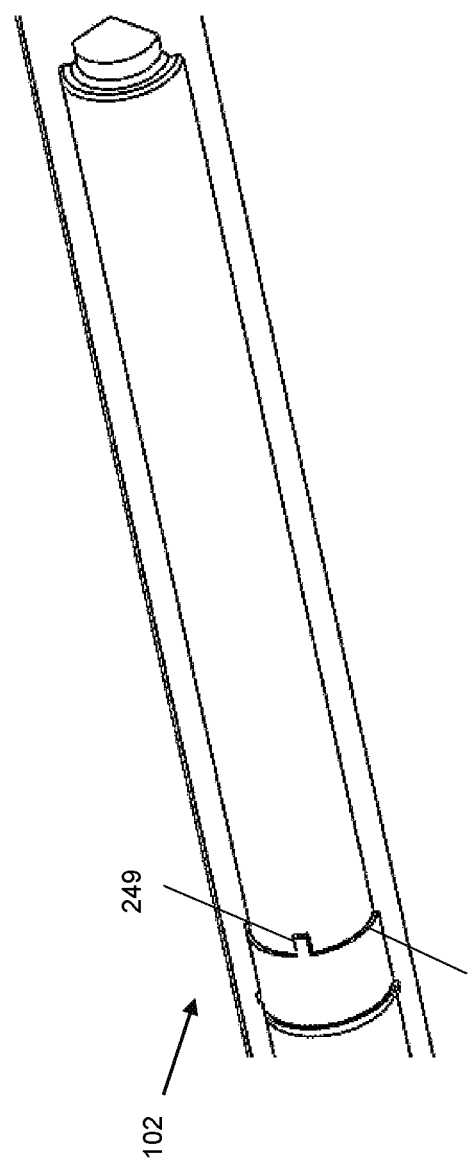
FIG. 14 shows a perspective view of a portion of the housing of an exemplary distraction and compression device in accordance with an embodiment of the invention.

With further reference to FIGS. 12-13, as shown, the ring gear 246 includes an inner wall 244 having internal teeth 248 as well as at least one raised portion 245 and at least one tab and/or projection 247. In particular, the ring gear 246 may include two tabs or projections 247. The raised portion 245 is positioned on an external surface of the ring gear 246 such that the raised portion 245 extends radially from the external surface of the ring gear 246. In some embodiments, the ring gear 246 can include two raised portions 245 positioned on opposing sides of the ring gear 245. The raised portion 245 engages and/or mates with a complementary cutout or depression 249 (FIG. 14) formed within the housing 102 on an internal surface thereof, at a location where the housing 102 surrounds the ring gear 246. Where two opposing raised portions 245 are included on the ring gear 246, the housing 102 can include two opposing complementary cutouts or depressions 249. Any number of raised portions 245 and complementary cutouts 249 can be included without departing from aspects of the disclosure. Further, it is contemplated that an alternative configuration is equally applicable, as the housing 102 can include one or more raised portions that engage with and/or mate with complementary cutouts or depressions on the ring gear 246.

The tab 247 of the ring gear 246 can be positioned about an end of the ring gear 246 and extend radially therefrom. The tab 247 may engage and/or mate with a complementary groove 251 formed within the housing 102 on an internal surface thereof, where the housing 102 surrounds the ring gear 246 (see FIG. 14). It is to be understood that any number of tabs and/or projections 247 and complementary grooves 251 can be included without departing from aspects of the disclosure. For example, the ring gear 246 can include two tabs 247 on opposing sides of the ring gear 246. As shown, in some embodiments, each tab 247 may be positioned between the raised portions 245 such that tabs and raised portions 245 alternate about the ring gear 246. Further, it is contemplated that an alternative configuration is equally applicable, as the housing 102 can include tabs and/or projections that engage with and/or mate with complementary grooves on the ring gear 246. These complementary features on the ring gear 246 and housing 102 prevent the ring gear 246 from moving axially relative to the housing 102.

Referring back to FIGS. 10-11, and referring also to FIGS. 15-22, the device 100 may include a lock mechanism 300, which may be configured to lock and unlock rotation of a driver and a driven gear system. The lock mechanism 300 may be configured to allow the driver to drive in either forward or reverse, i.e., to rotate in either direction depending on the desired distraction or compression application, in response to rotation of the driver. Thus, in the unlocked position, the lock mechanism 300 permits the driver and the driven gear system to rotate in either a clockwise direction or a counterclockwise direction as actuated by the driver. However, in the locked position, the lock resists, and in some embodiments prevents entirely, any rotation in the absence of rotation of the driver. As a result, the lock mechanism 300 resists, reduces, minimizes, or prevents back-driving and distraction loss caused by loads on the lead screw 122 when in the locked position.

In various embodiments, the driver may be any actuator of rotational motion. In the embodiment depicted in FIG. 10, the driver is a magnetic assembly 200 as described herein, including a cylindrical permanent magnet 202 that is configured to be rotated by the application of a magnetic field, and a magnet housing 204 disposed about the cylindrical permanent magnet 202. However, in other embodiments, the driver may be, e.g., a motor. Further, in various embodiments, the driven gear system may be a gear assembly 216 as described herein, and may particularly be a planetary gear system including a sun gear 218 that is configured to engage a ring gear 246 via a plurality of planetary gears 226 (see FIG. However, in other embodiments, the driven gear assembly may be, for example, a cycloid gear assembly. In still other embodiments, the magnet assembly may engage the lead screw 122 direction, without a driven gear assembly interposed between the magnet assembly and the lead screw.

As noted, FIGS. 10-11 illustrate an embodiment in which the driver is in the form of a cylindrical permanent magnet 202 disposed within a magnet housing 204. The magnet housing 204 includes a first drive pin 302 and a second drive pin 304. As best shown in FIG. 11, each of the first and second drive pins 302, 304 extends axially from a first end of the magnet housing 204, in a direction parallel to a longitudinal axis of the cylindrical magnet 202. The first and second drive pins 302, 304 may be arranged on the end face of the magnet housing 204 such that they are disposed substantially opposite one another, spaced about 180 degrees apart from one another on the end face of the magnet housing 204. The magnet housing 204 may further include a central recess 307 that is open to the first end of the magnet housing 204, and is disposed between the first drive pin 302 and the second drive pin 304. The central recess 307 may be centered on, or concentric with the longitudinal, i.e. rotational axis of the cylindrical magnet 202 and the magnet housing 204.

Referring back to FIG. 10, a keyed drive gear 320 is configured to be driven by the driver, e.g., by magnet housing 204, via the keeper 330, discussed further herein. The keyed drive gear 320, shown in detail in FIGS. 18-19, includes a central pin 322 coupled to a keyed portion 324, and a gear 218 coupled to the keyed portion 324 at an end opposite the end at which the keyed portion 324 is coupled to the central pin 322. Thus, the keyed portion 324 is disposed between the central pin 322 and the gear 218, each of which is coupled to the keyed portion 324 of the drive gear 320 at opposing ends thereof. The central pin 322, the keyed portion 324, and the gear 218 may be substantially coaxial with one another. As noted above, the gear 218 may be a sun gear in a planetary gear system. When assembled as shown in FIG. 20, the central pin 322 is configured to be disposed at least partly within the central recess 307 of the magnet housing 204. The keyed portion 324 may have any non-circular keyed cross-sectional geometry such as, for example, square, hexagon, rectangle, star, etc. In particular embodiments, the keyed portion 324 may have a square cross-sectional geometry.

A keeper 330 is disposed over at least a portion of the drive gear 320, and is interposed between the drive gear 320 and the driver. The keeper 330 is configured to move, e.g. by rotating, from a locked position to an unlocked position in response to rotation of the driver, e.g., magnet housing 204. In the locked position, the keeper 330 is configured to resist, reduce, minimize, or in certain embodiments prevent rotation of the drive gear 320 and the magnet housing 204 under a load on the driven gear system 216, and in the unlocked position, the keeper 330 is configured to permit rotation of the drive gear 320 and the driver, e.g., magnet housing 204.

Figure 17:
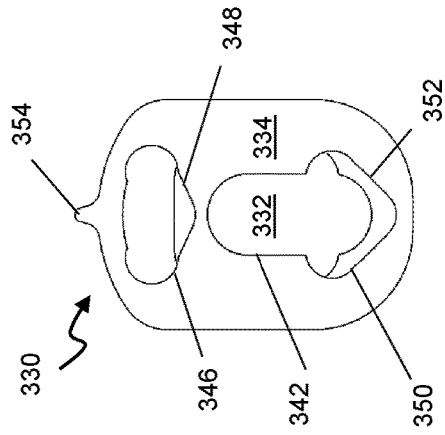
FIGS. 15-17 show perspective, front, and back views of a keeper as deployed in the lock mechanism of at least FIG. 10, in accordance with embodiments of the invention.
Figure 16:
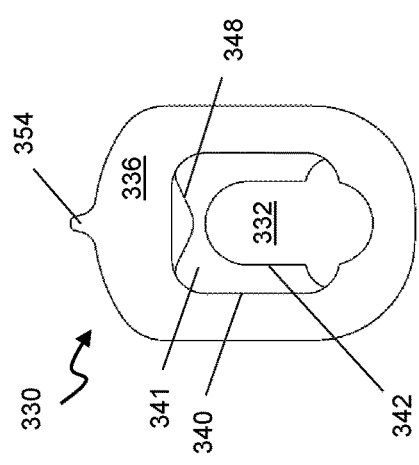
Figure 15:
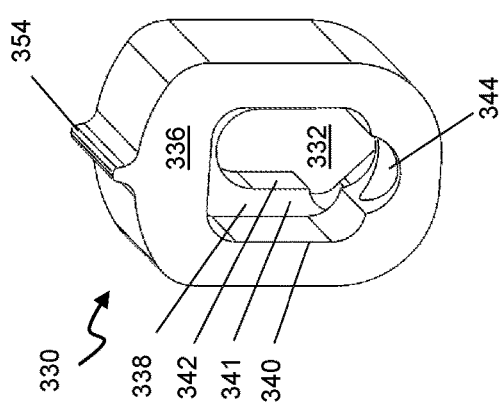
Figure 19:
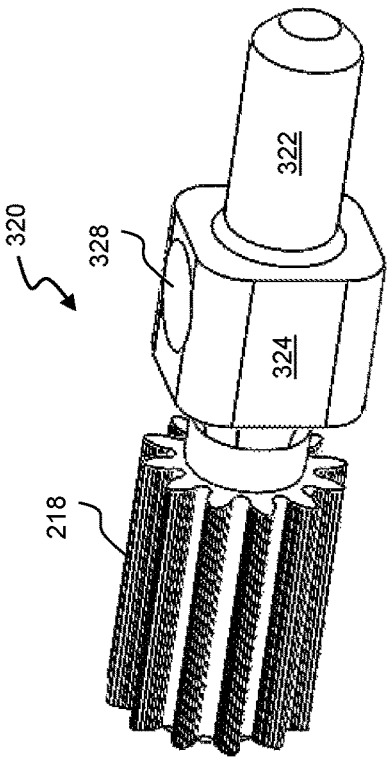
FIGS. 18-19 show perspective views of a keyed drive gear as deployed in the lock mechanism of at least FIG. 10, in accordance with embodiments of the invention.
Figure 18:
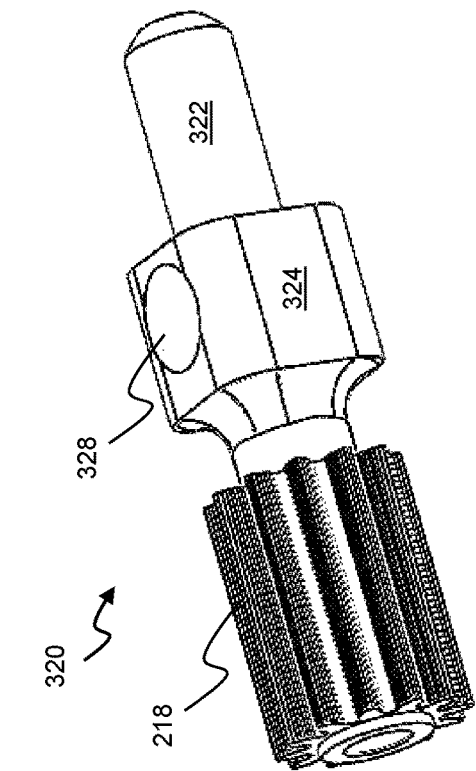

As best seen in FIGS. 15-17, the keeper 330 includes a body having a first face 334 and a second face 336, where the first face 334 is configured to engage the driver, e.g., the magnet housing 204, and the second face 336 is configured to engage the driven gear system via the keyed drive gear 320.

A keyed opening 341 is disposed within the body and is open to the second face 336. The keyed opening 341 is configured to receive and rotatably engage the keyed portion 324 of the drive gear 320. The keyed opening 341 may extend from the second face 336 of the body of keeper 330 through a partial thickness of the keeper 330. The keyed opening 341 is shaped and dimensioned to provide a complementary fit with the keyed portion 324 of the drive gear 320, such that, for example, the keyed portion 324 fits in male/female engagement within the keyed opening 341 of the keeper 330. Where, for example, the keyed portion 324 has a square, hexagon, rectangle, star, or other shape, the keyed opening 341 may have a corresponding square, hexagon, rectangle, star, or other shape that is dimensioned to receive the complementary square, hexagon, rectangle, star, or other keyed shape with a close fit. As a result, the keeper 330 and the drive gear 320 are rotationally fixed to one another via the keyed opening 341. For example, in embodiments in which the keyed portion 324 is square shaped, the keyed opening 341 may also be square shaped.

The keeper 330 may also include an opening 332 in the body, which is configured to receive the center pin 322 of the drive gear 320. The opening may extend from the first face 334 of the keeper 330 through at least a partial thickness of the body. The opening 332 and the keyed opening 341 may be fluidly coupled with one another, such that the opening 332 and the keyed opening 341 may partially overlap with one another. Therefore, the opening 332 may effectively extend from the first face 334 through a full thickness of the body of the keeper 330 to the second face 336 in certain areas. The keyed opening 341 may be bounded by drive surfaces 340, which are configured to drive rotation of the keyed portion 324 of the drive gear 320, while the opening 332 may be bounded by shaft relief surfaces 342, which are configured to permit translation of the center pin 322. In particular, the opening 332 may include an oblong or slot-shaped portion defined by the shaft relief surfaces 342, as shown in FIGS. 17, 21, and 22. This oblong shape may permit the body of the keeper 330 to translate relative to the center pin 322 in operation, as illustrated in the change in relative position of center pin 322 and opening 332 from the locked position of FIG. 21 to the unlocked position of FIG. 22. The keeper 330 may further include a stepped surface 338, shown in FIG. 15, disposed between the drive surfaces 340 and the shaft relief surfaces 342.

The keeper 330 further includes at least one lock tooth 354 disposed on a first end of the keeper 330, and extending axially therefrom. The lock tooth 354 is configured to releasably mesh with or engage the internal teeth 248 on the inner wall 244 of a ring gear 248 of the driven gear system in use (see FIGS. 21-22).

The keeper 330 may further include a first detent 346 disposed on the first face 334 of the keeper 330, the first detent 346 being configured to engage the first drive pin 302. The first detent 346 may particularly be disposed between the opening 332 and the first end of the body (which includes the lock tooth 354). The keeper 330 may further include a second detent 350, also disposed on the first face 334 of the keeper 330, the second detent 350 being configured to engage the second drive pin 304. The second detent 350 may particularly be disposed at the second end of the keeper 330, opposite the first end, and in fluid connection with the opening 332. It is noted that the first detent 346 may alternatively receive the second drive pin 304, and the second detent 350 may receive the first drive pin 302, to the same result.

Each of the first detent 346 and the second detent 350 may include a respective ramp surface 348, 352, along which the respective drive pin 302, 304 is configured to travel. The first ramp 348 and second ramp 352 may each be configured to be curved or angled, having approximately or substantially a u-shaped or v-shaped ramp surface. Each ramp 348, 352 may include a zenith which is laterally aligned with one another, and are also laterally aligned with the lock tooth 354 on the keeper 330. Accordingly, the drive pins 302, 304 disposed in each of the first detent 346 and the second detent 350 are disposed in the zeniths of the first ramp 348 and the second ramp 352 when the keeper 330 is in the locked position. The drive pins 302, 304 disposed in each of the respective first and second detents 346, 350 are configured to move up the respective first ramp 348 and the second ramp 352 when the keeper 330 moves into the unlocked position. In this manner, the first detent 346 and the second detent 350 are configured to permit rotation of the driver, e.g., magnetic housing 204, relative to the keeper 330 to an extent limited by a length of the first ramp 348 and the second ramp 352. In certain embodiments, the first detent 346 and the second detent 350 each extend through a partial thickness of the keeper 330.

As illustrated in FIG. 15, the keeper 330 further includes a hole 344 extending from the keyed opening 341 through the second end of the keeper 330. The second end of the keeper 330 is the end opposite the first end, on which the lock tooth 354 is disposed. Keyed portion 324 of drive gear 320 also includes a hole 328 (see FIGS. 18-19) which, when assembled as in FIG. 20, is aligned with hole 344. Thus, the holes 344 and 328 in the keeper 330 and the keyed portion 324 of the drive gear 320 form a substantially continuous hole or channel. The lock mechanism 300 further includes a biaser 306 disposed within the aligned holes 344 and 328. The biaser 306 may be, for example, a spring. The biaser 306 may be configured to bias the keeper 330 across, or in a direction substantially perpendicular to a longitudinal axis of the magnet housing 204 and the drive gear 320. With reference to FIG. the lock mechanism 300 may further include a radial bearing 308, which may be disposed about at least a portion of the magnet housing 204, the keeper 330, and the keyed drive gear 320, and may be configured to maintain a coaxial relationship between two or more of an end portion of the magnet housing 204, the keeper 330, and the keyed drive gear 320.

In operation, the lock mechanism 300 including the keeper 330, defaults to a locked position when the driver, e.g., magnet housing 204, is stationary (see FIG. 21). In the locked position, the biaser 306 is configured to bias the keeper 330 relative to the ring gear 246 and the drive gear 320, such that the lock tooth 354 on the keeper 330 is biased into meshed engagement with the teeth 248 on the inner surface 244 of the ring gear 246. In particular, the lock tooth 354 may be maintained in engagement between two teeth 248 of the ring gear 246 under the biasing force of biaser 306 in its expanded condition. This biasing force may be applied across or perpendicular to the longitudinal axis of the magnet housing 204 and the keyed drive gear 320. Due to the geometry of the detents, the first and second drive pins 302, 304 are disposed in the zenith positions of each of the respective ramps 348, 352 in the locked position. In this position, the keeper 330 resists rotation of the drive gear 320 and the magnet housing 204. This resistance to rotation is independent of any load on the driven gear system.

Upon, and in response to rotation of the driver, e.g., the magnet housing 204, the keeper 330 transitions from the locked position to the unlocked position. As the magnet housing 204 rotates, either in a clockwise or counterclockwise direction, the drive pins 302, 304 move out of the zenith position following the curve or slope of ramps 348, 352. In the embodiment shown in FIG. 22, the magnet housing 204 has rotated in a counter clockwise direction, although the keeper 330 would function analogously if the rotation were clockwise. This rotation causes the keeper 330 to translate axially relative to the center pin 322 in the direction of the second end, opposite the first end, urged by the interaction between the ramps 348, 352 and the drive pins 302, 304. Relative to the translation of the keeper 330 toward the unlocked position, the lock tooth 354 is disposed on a trailing end of the keeper 330. This translation of the keeper 330 compresses the biaser, and causes the lock tooth 354 to disengage from the ring gear 246. With the lock tooth 354 now disengaged from the teeth 248 of the ring gear 246, the keeper 330 moves to its unlocked position, in which the keyed drive gear 320, and therefore the magnet housing 204 and the driven gear assembly 216, are free to rotate relative to the ring gear 246.

Upon, and in response to a cessation of rotation of the magnet housing 204, the opposite process occurs. In the absence of rotation of the magnet housing 204, and under the biasing force of biaser 306, the drive pins 302, 304 move downward along the ramps 348, 352 to return to the zenith position depicted in FIG. 21, and the keeper 330 translates axially relative to the central pin 322. The lock tooth 354 is on the leading end of the keeper 330 with respect to this translation motion toward the locked position. Lock tooth 354 engages the teeth 348 of the ring gear 246, thereby preventing rotation of the keeper 330, and therefore the keyed drive gear 320, which is rotationally fixed to the keeper 330. When the keyed drive gear 320 is rotationally locked, so too are the sun gear 218, the balance of gear assembly 216, and the lead screw 122. In this manner, regardless or independently of the load placed on the lead screw 122 and the gear assembly 216, distraction or compression loss is resisted, and may in some embodiments be prevented.

Figure 23:
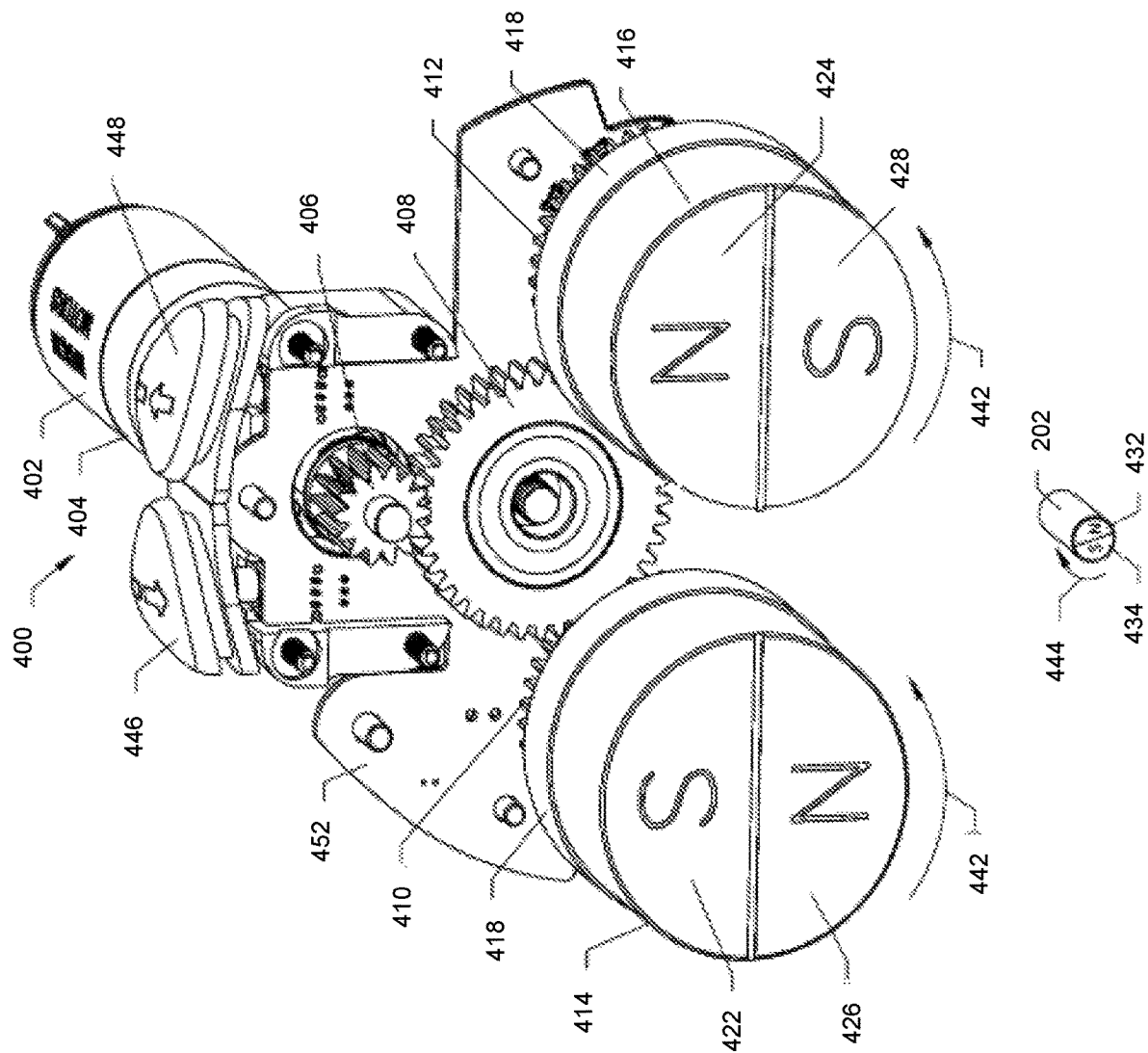
FIG. 23 shows the internal components of an external adjustment device for non-invasively adjusting a distraction and compression device according to embodiments of the invention.
Figure 24:
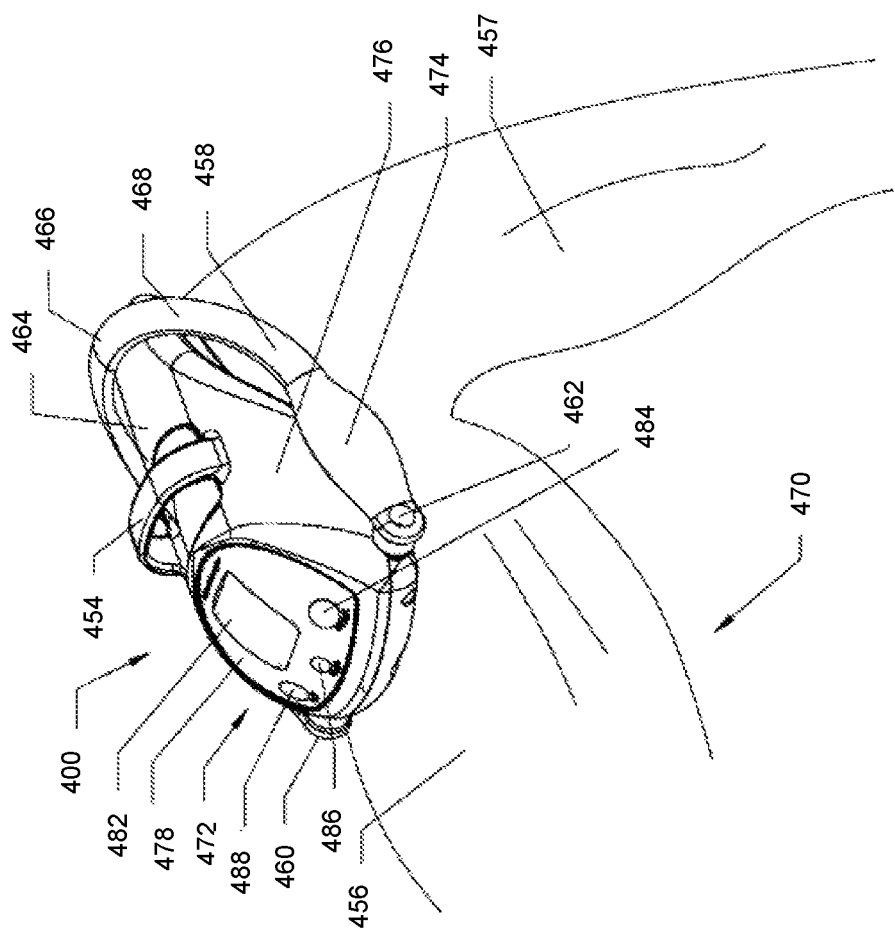
FIGS. 24-25 show external adjustment devices in configurations for adjusting a distraction and compression device implanted within a femur, and within a tibia, respectively, in accordance with embodiments of the invention.
Figure 25:
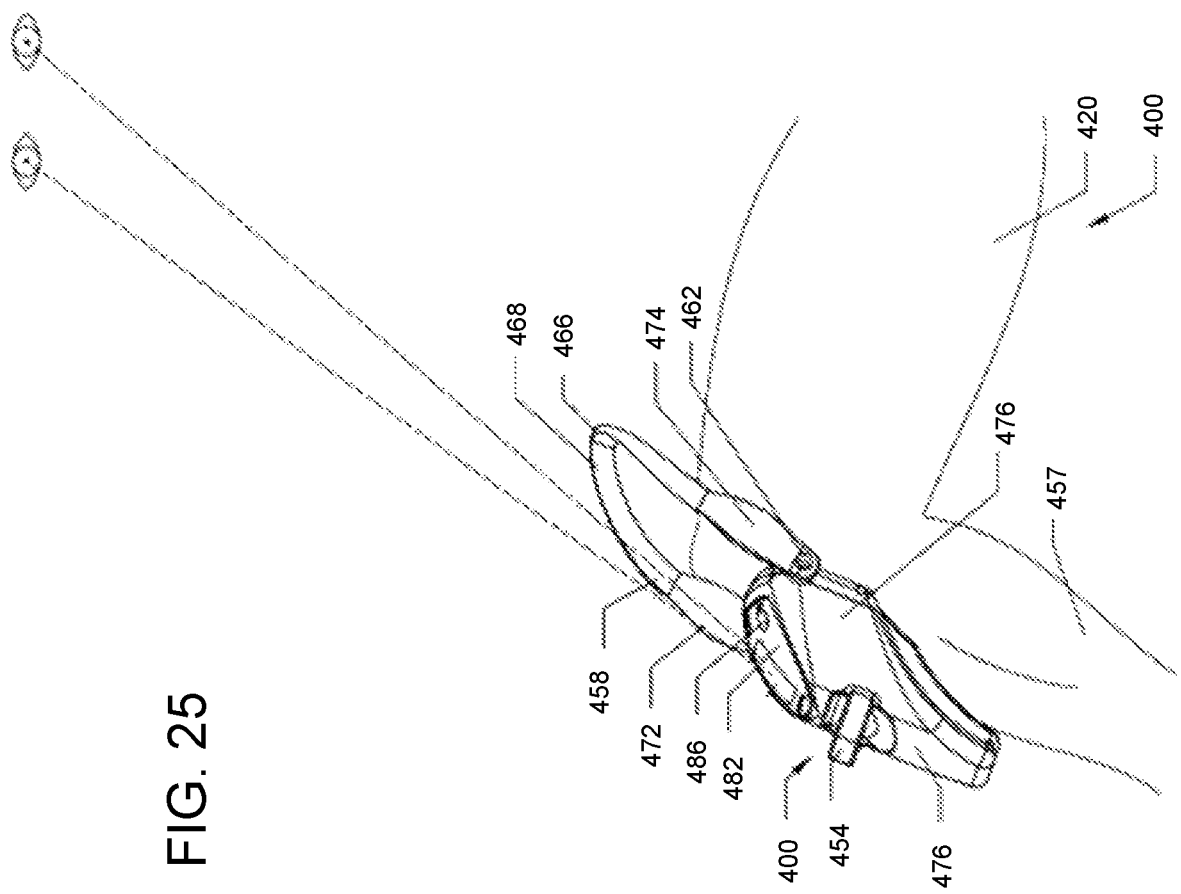

FIGS. 23-25 illustrate an external adjustment device 400 configured for applying a moving magnetic field to allow for non-invasive adjustment of the device 100 by turning a permanent magnet 202 within the device 100, as described. FIG. 23 illustrates the internal components of the external adjustment device 400, and for clear reference, shows the permanent magnet 202 of the device 100 without the rest of the assembly. The internal working components of the external adjustment device 400 may, in certain embodiments, be similar to those described in U.S. Patent Application Publication No. 2012/0004494, which is incorporated by reference herein. A motor 402 with a gear box 404 outputs to a motor gear 406. The motor gear 406 engages and turns central (idler) gear 408, which has the appropriate number of teeth to turn first and second magnet gears 410, 412 at identical rotational speeds. First and second magnets 414, 416 turn in unison with the first and second magnet gears 410, 412, respectively. Each magnet 414, 416 is held within a respective magnet cup 418 (shown partially). An exemplary rotational speed may be 60 RPM or less. This speed range may be configured to limit the amount of current density induced in the body tissue and fluids, to meet international guidelines or standards. As seen in FIG. 23, the south pole 422 of the first magnet 414 is oriented the same as the north pole 424 of the second magnet 416, and likewise, the first magnet 414 has its north pole 426 oriented the same as the south pole 428 of the second magnet 416. As these two magnets 414, 416 turn synchronously together, they apply a complementary and additive moving magnetic field to the radially-poled, permanent magnet 202, having a north pole 432 and a south pole 434. Magnets having multiple north poles (for example, two) and multiple south poles (for example, two) are also contemplated in each of the devices. As the two magnets 414, 416 turn in a first rotational direction 442 (e.g., counter-clockwise), the magnetic coupling causes the permanent magnet 202 to turn in a second, opposite rotational direction 444 (e.g., clockwise). The rotational direction of the motor 402 and corresponding rotational direction of the magnets 414, 416 is controlled by buttons 446, 448. One or more circuit boards 452 contain control circuitry for both sensing rotation of the magnets 414, 416 and controlling the rotation of the magnets 414, 416.

FIGS. 24 and 25 show the external adjustment device 400 for use with a device 100 placed in the femur (FIG. 24) or the tibia (FIG. 25). The external adjustment device 400 has a first handle 454 for carrying or for steadying the external adjustment device 400, for example, steadying it against an upper leg 456 (as in FIG. 24) or lower leg 457 as in (FIG. 25). An adjustable handle 458 is rotationally attached to the external adjustment device 400 at pivot points 460, 462. Pivot points 460, 462 have easily lockable/unlockable mechanisms, such as a spring-loaded brake, ratchet or tightening screw, so that a desired angulation of the adjustable handle 458 in relation to housing 464 can be adjusted and locked in orientation. Adjustable handle 458 is shown in two different positions in FIGS. 24 and 25. In FIG. 24, adjustable handle 458 is set so that apex 466 of loop 468 rests against housing 464. In this position, patient 470 is able to hold onto one or both of grips 472, 474 while the adjustment procedure (for example transporting bone between 0.10 mm to 1.50 mm) is taking place. It is contemplated that the procedure could also be a lengthening procedure for a bone lengthening device or a lengthening procedure for a lengthening plate which is attached external to the bone. Turning to FIG. 25, when the bone transport device 100 is implanted in a tibia, the adjustable handle 458 may be changed to a position in which the patient 470 can grip onto the apex 466 so that the magnet area 476 of the external adjustment device 400 is held over the portion of the device 100 containing the permanent magnet 202. In both cases, the patient 470 is able to clearly view control panel 478 including a display 482. In a different configuration from the two directional buttons 414, 416 in FIG. 24, the control panel 478 includes a start button 484, a stop button 486 and a mode button 488. Control circuitry contained on circuit boards 452 may be used by the surgeon to store important information related to the specific aspects of each particular patient. For example, in some patients an implant may be placed antegrade into the tibia. In other patients the implant may be placed either antegrade or retrograde about the femur. In each of these three cases, it may be desired to move the bone either from distal to proximal or from proximal to distal. By having the ability to store information of this sort that is specific to each particular patient within the external adjustment device 400, the external adjustment device 400 can be configured to direct the magnets 414, 416 to turn in the correct direction automatically, while the patient need only place the external adjustment device 400 at the desired position, and push the start button 484. The information of the maximum allowable bone transport length per day and maximum allowable bone transport length per session can also be input and stored by the surgeon for safety purposes. These may also be added via an SD card or USB device, or by wireless input. An additional feature is a camera at the portion of the external adjustment device 400 that is placed over the skin. For example, the camera may be located between first magnet 414 and second magnet 416. The skin directly over the implanted permanent magnet 202 may be marked with indelible ink. A live image from the camera is then displayed on the display 482 of the control panel 478, allowing the user to place the first and second magnets 414, 416 directly over the area marked on the skin. Crosshairs can be overlaid on the display 482 over the live image, allowing the user to align the mark on the skin between the crosshairs, and thus optimally place the external adjustment device 400.

Other external adjustment devices can be used to cause actuation of the distraction devices described herein. Such external adjustment devices include, for example, those described in U.S. Pat. No. 8,382,756 filed on Nov. 20, 2009, U.S. Pat. No. 9,248,043 filed Jun. 29, 2011, U.S. Pat. No. 9,078,711 filed on Jun. 6, 2012, U.S. Pat. No. 9,044,281 filed on Oct. 18, 2012, U.S. application Ser. No. 14/698,665 filed on Apr. 28, 2015, U.S. application Ser. No. 14/932,904 filed on Nov. 4, 2015, U.S. Ser. No. 16/004,099 filed on Dec. 12, 2016, and App. No. PCT/US2020/017338 filed on Feb. 7, 2020, all of which are incorporated herein by reference as if set forth in their entirety.

With reference to FIGS. 26-33, device 100 may include a lock mechanism 500, which may provide an alternative embodiment to the devices 100 including the lock mechanism 300 described previously. Like the first embodiment of a lock mechanism 300, the second embodiment of a lock mechanism 500 is configured to lock and unlock rotation of a driver and a lead screw 122. The lock mechanism 500 may be configured to allow the driver to drive in either forward or reverse, i.e., to rotate in either clockwise or counterclockwise direction depending on the desired distraction or compression application, in response to rotation of the driver. Thus, in the unlocked position, the lock mechanism 500 permits the driver and the lead screw to rotate in either a clockwise direction or a counterclockwise direction as actuated by the driver. However, in the locked position, the lock mechanism 500 resists, and in some embodiments prevents entirely, any rotation in the absence of rotation of the driver. As a result, the lock mechanism 500 resists, reduces, minimizes, or prevents distraction loss caused by loads on the lead screw 122 when in the locked position.

In various embodiments, the driver may be any actuator of rotational motion. For example, in the embodiment depicted in FIGS. 26-28 and 34, the driver is a magnetic assembly 200 as described herein, including a cylindrical permanent magnet 202 that is configured to be rotated by the application of a magnetic field, and a magnet housing 204 may be disposed about the cylindrical permanent magnet 202. The magnet housing 204 may be made up of separate magnet cups 207, 208 as described previously. In other embodiments, the driver may be, e.g., a motor.

Figure 27:
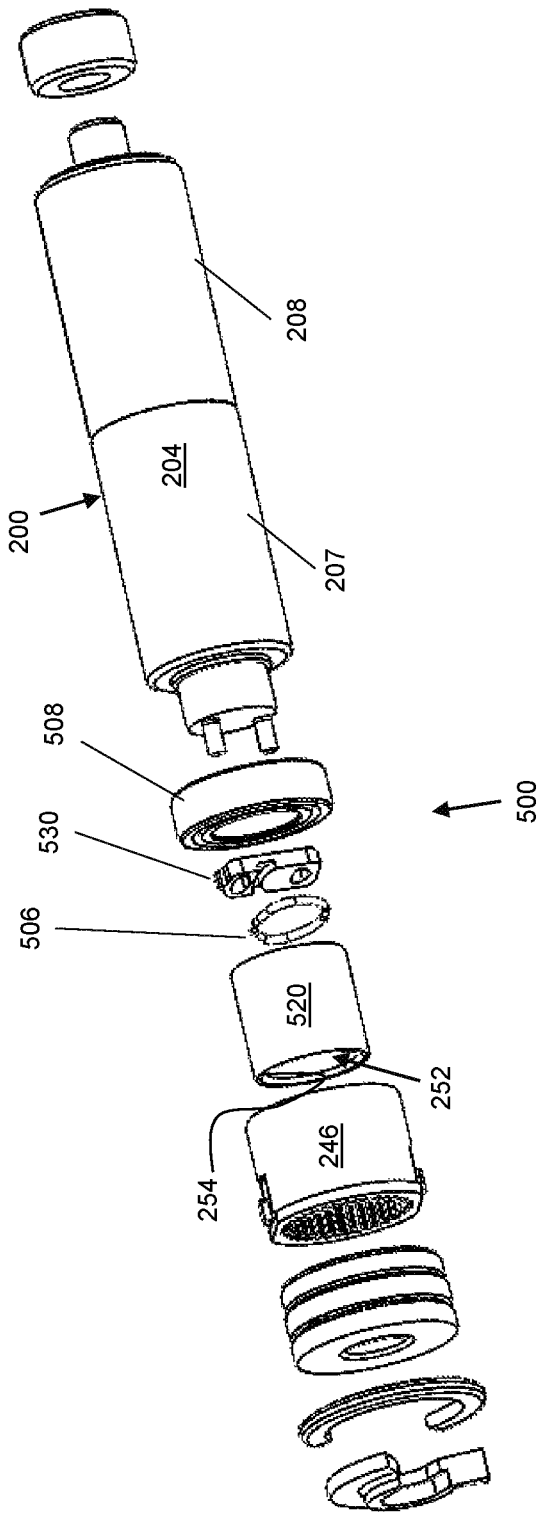
FIG. 27 shows an exploded perspective view of a magnet assembly and a magnet lock mechanism in accordance with an embodiment of the invention.
Figure 28:
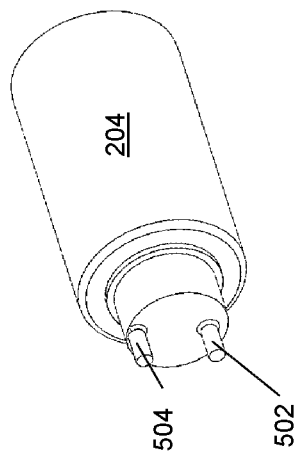
FIG. 28 shows an enlarged perspective view of the magnet housing of FIG. 27, in accordance with an embodiment of the invention.

As noted, FIGS. 27-28 illustrate an embodiment in which the driver is in the form of a cylindrical permanent magnet 202 disposed within a magnet housing 204. The magnet housing 204 includes a first drive pin 502 and a second drive pin 504. As best shown in FIG. 28, each of the first and second drive pins 502, 504 extends axially from a first end of the magnet housing 204, in a direction parallel to the axis of rotation of the cylindrical permanent magnet 202. The first and second drive pins 502, 504 may be arranged such that they are disposed substantially opposite one another, spaced about 180 degrees apart from one another on the end face of the magnet housing 204.

A keyed drive stage 520, shown in detail in FIGS. 32-33 and in context in FIGS. 26, 27, and 34-36, is configured to be driven by the driver, e.g., by the magnet housing 204. The keyed drive stage 520 includes, on a torque input end, a first rotational slot 522 and a second rotational slot 524, each configured to receive one of the first and second drive pins 502, 504. As such, first and second rotational slots 522 and 524 may be arranged such that they are disposed substantially opposite one another, spaced about 180 degrees apart from one another on the input end of the keyed drive stage 520. Each of the first and second rotational slots 522 and 524 may have an arcuate shape, configured to allow a limited amount of rotation of the driver relative to the rotational slots 522, 524. The input end may further include a recess 527 shaped and dimensioned to receive a keeper 530 as described herein, and to allow the keeper 530 to translate across a rotational axis of the keyed drive stage 520 as further described herein. Still further, the recess 527 may include vertical guide surfaces 529 configured to define or guide the keeper 530 on the translational path of the keeper 530. The recess 527 may further be configured to allow the keeper 530 to translate beyond or across the outer circumference of the end of the keyed drive stage 520, to allow the keeper 530 to engage with a ring gear 246 disposed about the keyed drive stage 520, as described further herein.

On the second, torque output end of the keyed drive stage 520, an opening 252 having a keyed internal surface 254 is provided, as described elsewhere herein. The opening 252 may be configured to matingly receive and engage a keyed male feature such as, e.g., an external keyed surface 140 on the end 134 of a lead screw 122, to transmit torque. The keyed opening 252 may have any cross-sectional geometry configured to transmit torque, for example, square, rectangle, hexagon, or star. The keyed drive stage 520 may further include a retainer 150 as described herein relative to, e.g., FIG. 5.

A keeper 530, shown in detail in FIGS. 29-31, and in context in FIGS. 26, 27, and 34-36, may be configured to be disposed within the recess 527 in the keyed drive stage 520. The keeper 530 is configured to move from a locked position to an unlocked position in response to rotation of the driver, e.g., magnet housing 204. In particular, the keeper 330 is configured to rotate and to translate in response to the rotation of the driver, thereby moving from the locked position to the unlocked position. In the locked position, the keeper 530 is configured to resist, reduce, minimize, or in certain embodiments prevent rotation of the keyed drive stage 520 and the magnet housing 204 under a load on the lead screw 122. In the unlocked position, the keeper 530 is configured to permit rotation of the keyed drive stage 520 and the driver, e.g., magnet housing 204.

As best seen in FIGS. 29-31, the keeper 530 includes a body configured to be received within the recess 527. The keeper 530 may include drive surfaces 540 which are configured to cooperate with the vertical guide surfaces 529 on the recess 527 to allow the keeper 530 to translate along the recess 527, and to allow the keeper 530 to drive rotation of the keyed drive stage 520. The drive surfaces 540 may be straight or substantially straight surfaces that are parallel or substantially parallel to one another, and perpendicular to the axis of rotation of the keyed drive stage 520.

The keeper 530 may include at least one lock tooth 554 disposed on a first end of the keeper 530, and extending axially therefrom. The lock tooth 554 is configured to releasably mesh with or engage the internal teeth 248 on the inner wall 244 of a ring gear 248 in use (see FIGS. 35-36). The lock tooth maybe any mating male/female shapes for example square or triangular tooth shapes. The keeper 530 further includes a first detent 546, which may be disposed at the first end, near the lock tooth 554, and may be laterally aligned with the lock tooth 554. The first detent 546 may be configured to engage the first drive pin 502 in use. The keeper 530 may further include a second detent 550, disposed at the second end of the keeper 530 opposite the first end, the second detent 550 being configured to engage the second drive pin 504. The second detent may also be laterally aligned with the first detent 546 and the lock tooth 554. It is noted that the first detent 546 may alternatively engage the second drive pin 504, and the second detent 550 may engage the first drive pin to equal effect.

Each of the first detent 546 and the second detent 550 may include a respective ramp surface 548, 552, along which the respective drive pin 502, 504 is configured to travel. The first ramp 548 and second ramp 552 may each be configured to be curved or angled, similar to first ramp 348 and second ramp 352 (see FIG. 17), having an approximately or substantially u-shaped or v-shaped ramp surface. Each ramp 548, 552 may include a zenith which is laterally aligned with the other, and also laterally aligned with the lock tooth 554 on the keeper 530. Accordingly, the drive pins 502, 504 disposed in each of the first detent 546 and the second detent 550 are disposed in the zeniths of the first ramp 548 and the second ramp 552 and in line with the lock tooth 554 when the keeper 530 is in the locked position. The drive pins 502, 504 disposed in each of the respective first and second detents 546, 550 are configured to move up the respective first ramp 548 and the second ramp 552 when the keeper 530 moves into the unlocked position. In certain embodiments, the first detent 546 and the second detent 550 each extend through a full thickness of the keeper 530.

As shown in FIGS. 29-30, the keeper 530 further includes a spring guide slot 544. Unlike the detents 546 and 550, the spring guide slot 544 may extend through only a partial thickness of the keeper 530. The spring guide slot 344 may be curved, and may be configured to receive a portion of a biaser or spring 506 (see FIG. 27) therein. As such, the shape and size of spring guide slot 544 may be complementary to that of a portion of spring 506.

The lock mechanism 500 further includes the biaser or spring 506, which may be disposed partially within the spring guide slot 344, and partially within a spring contour 528 in the recess 527. The biaser 506 may be configured to bias the keeper 530 away from the spring contour 528. The recess 527 may be open at the end 526 that is opposite the spring contour 528. Thus, the biaser may be configured to bias the keeper 530 across, or in a direction substantially perpendicular to the rotational axis of the magnet assembly, such that the lock tooth 554 extends beyond the outer circumference of the keyed drive stage 520. In use, this allows the lock mechanism 500 to achieve the locked position shown in FIG. 35.

Figure 26:
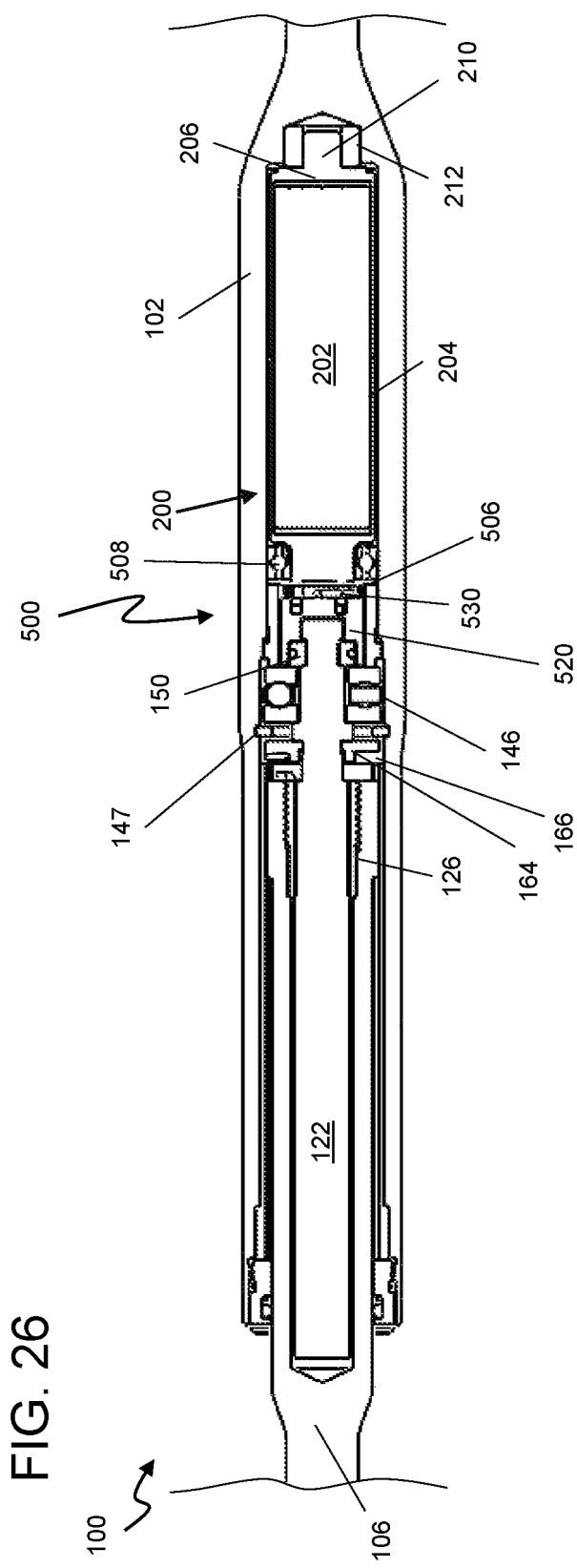
FIG. 26 shows a cross sectional view of a portion of an exemplary distraction and compression device including a lock mechanism in accordance with an embodiment of the invention.

With reference to FIGS. 26-27 and 34, the lock mechanism 500 may further include a radial bearing 508, which may be disposed about at least a portion of the magnet housing 204, and may be configured to assist in maintaining the spatial relationships between the magnet housing 204, the keeper 530, and the keyed drive stage 520.

In operation, the lock mechanism 500 including the keeper 530, defaults to a locked position when the driver, e.g., magnet housing 204, is stationary (see FIG. 35). In the locked position, the biaser 506 is configured to bias the keeper 530 toward the open end 526 and against the spring contour 528 of the recess 527. Under the force of biaser 506 in its expanded condition, the keeper 530 translates across the rotational axis toward and at least partially through the open end 526 of the recess 527, such that the lock tooth 554 on the keeper 530 extends beyond an outer circumference of the keyed drive stage 520 and is biased into meshed engagement with the teeth 248 on the inner surface 244 of the ring gear 246. Due to the geometry of the first and second detents 546, 550, the first and second drive pins 502, 504 are disposed in the zenith positions of each of the respective ramps 348, 352. In this position, the keeper 530 resists rotation of the keyed drive stage 520 and under a load on the lead screw 122 (see FIG. 34).

Upon, and in response to rotation of the driver, e.g., the magnet housing 204, the keeper 530 transitions from the locked position to the unlocked position. As the magnet housing 204 rotates, either in a clockwise or counterclockwise direction, the drive pins 502, 504 move out of the zenith position following the curve or slope of ramps 548, 552. In the embodiment shown in FIG. 36, the magnet housing 204 has rotated in a counter clockwise direction, although the keeper 530 would function analogously if the rotation were clockwise. This rotation causes the keeper 530 to translate axially relative to the recess 527 in the direction away from the open end 526. Relative to this translation motion, the lock tooth 554 is disposed on a trailing end of the keeper 530. This translation causes the lock tooth 554 to disengage from the ring gear 246, and the biaser 506 to be compressed by the keeper 530, and in particular by spring guide slot 544. With the lock tooth 554 now disengaged from the teeth 248 of the ring gear 246, the keeper 530 moves to its unlocked position, in which the keyed drive stage 520, and therefore the lead screw 122, are free to rotate relative to the ring gear 246.

Upon, and in response to a cessation of rotation of the magnet housing 204, the opposite process occurs. In the absence of rotation of the magnet housing 204, and under the biasing force of biaser 506, the drive pins 502, 504 move downward along the ramps 548, 552 to return to the zenith position depicted in FIG. 35, and the keeper 530 translates axially relative to the recess 527. The lock tooth 554 is on the leading end of the keeper 530 with respect to this translation motion. Lock tooth 554 engages the teeth 248 of the ring gear 246, thereby preventing rotation of the keyed drive stage 520. Where the keyed drive stage 520 is rotationally fixed, so too is the lead screw 122. In this manner, regardless or independently of the load placed on the lead screw 122, back-driving and resulting distraction or compression loss are resisted, and may in some embodiments be prevented.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 mm, or, more specifically, about 5 mm to about 20 mm," is inclusive of the endpoints and all intermediate values of the ranges of "about 5 mm to about 25 mm," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An implantable medical device comprising:
a driver;
a driven gear system; and
a keeper, the keeper comprising:
a body;
a keyed opening in the body, the keyed opening being configured to receive a complementarily keyed portion of a drive gear of the driven gear system, wherein the keeper and the drive gear are rotationally fixed to one another;
an opening in the body configured to receive a center pin of the drive gear of the driven gear system, and further configured to permit the body to translate axially relative to the center pin; and
a lock tooth disposed on a first end of the body, the lock tooth being configured to releasably mesh with teeth on a ring gear of the driven gear system,
wherein the keeper is configured to move from a locked position to an unlocked position in response to a rotation of the driver,
wherein, in the locked position, the keeper is configured to resist rotation of the drive gear and the driver under a load on the driven gear system, and in the unlocked position, permits rotation of the drive gear and the driver.

2. The implantable medical device of claim 1, wherein the keeper is further configured to:
rotate to move from the locked position to the unlocked position;
translate axially relative to the center pin in a direction opposite the first end, in response to the rotating of the keeper; and
disengage the lock tooth from the ring gear of the driven gear system in response to the translating,
thereby moving the keeper to the unlocked position.

3. The implantable medical device of claim 1, wherein the keeper further comprises a first face configured to engage the driver, and a second face configured to engage the driven gear system.

4. The implantable medical device of claim 3, wherein the opening extends from the first face through the body to the second face, and wherein the keyed opening extends from the second face through a partial thickness of the keeper.

5. The implantable medical device of claim 4, wherein the opening and the keyed opening are fluidly coupled,
wherein the keyed opening is bounded by drive surfaces configured to drive rotation of the keyed portion of the drive gear, and the opening is bounded by shaft relief surfaces configured to permit translation of the center pin, and
wherein the keeper further comprises a stepped surface between the drive surfaces and the shaft relief surfaces.

6. The implantable medical device of claim 3, wherein the keeper further comprises:
a first detent disposed on the first face, the first detent being disposed between the opening and the first end of the body, the first detent comprising a first ramp surface, and
a second detent disposed on the first face at a second end thereof, opposite the first end, the second detent comprising a second ramp surface,
wherein each of the first detent and the second detent is configured to receive a drive pin disposed on an end of the driver.

7. The implantable medical device of claim 6, wherein the keeper further comprises:
a hole disposed in the second end of the body and open to the keyed opening, the hole being configured to receive a biaser,
wherein, in the locked position, the lock tooth is configured to engage the ring gear, and to maintain such engagement under biasing force from the biaser in an expanded condition, and
wherein, in the unlocked position, the lock tooth is configured to disengage from the ring gear, in response to a compression of the biaser upon rotation of the driver and the keeper.

8. The implantable medical device of claim 7, wherein the first ramp and the second ramp are each substantially v-shaped, and a zenith of the first ramp, a zenith of the second ramp, and the lock tooth are laterally aligned,
such that the drive pins disposed in each of the first detent and the second detent are disposed in the zeniths of the first ramp and the second ramp when the keeper is in the locked position, and
such that the drive pins disposed in each of the first detent and the second detent move up the respective first ramp and the second ramp when the keeper moves into the unlocked position.

9. The implantable medical device of claim 8, wherein the first detent and the second detent are further configured to permit rotation of the driver relative to the keeper to an extent limited by a length of the first ramp and the second ramp.

10. The implantable medical device of claim 6, wherein the first detent and the second detent each extend through a partial thickness of the keeper.

11. A lock mechanism configured for locking and unlocking rotation of a driver and a driven gear system in an implantable distraction and compression system, the lock mechanism comprising:
a driver of rotational motion, comprising a first drive pin and a second drive pin each extending axially from a first end of the driver;
a drive gear configured to be driven by the driver, the drive gear comprising a keyed portion, and
a keeper disposed over the drive gear and configured to move between a locked position and an unlocked position, the keeper comprising:
a keyed opening configured to rotatably engage the keyed portion of the keyed drive shaft,
a lock tooth disposed on a first end of the keeper, the lock tooth being configured to releasably engage a ring gear of the driven gear system,
a first detent and a second detent configured to engage the first drive pin and the second drive pin, and
a biaser configured to bias the keeper across a longitudinal axis of the driver and the drive gear,
wherein, in the locked position, the keeper resists rotation of the drive gear and the driver under a load on the driven gear system, and in the unlocked position, permits rotation of the drive gear and the driver.

12. The lock mechanism of claim 11, wherein, in the locked position, the biaser is configured to bias the keeper and the lock tooth into meshed engagement with the ring gear, and in the unlocked position, the biaser is configured to be compressed by the keeper upon rotation of the driver, thereby releasing engagement between the lock tooth and the ring gear and permitting the driver and the drive shaft to rotate.

13. The lock mechanism of claim 11, wherein the driver further comprises a central recess open to the first end of the driver and disposed between the first drive pin and the second drive pin, and
   wherein the drive gear further comprises a central pin and a gear, each coupled to the keyed portion of the drive gear at opposing ends thereof, wherein the central pin is disposed at least partly within the central recess of the driver.

14. The lock mechanism of claim 11, further comprising a hole extending from the keyed opening through the second end of the keeper, and into the keyed portion,
   wherein the second end is opposite the first end, and
   wherein the biaser is disposed within the hole.

15. The lock mechanism of claim 11, further comprising a radial bearing configured to maintain a coaxial relationship between two or more of the driver, the keeper, and the keyed drive gear.

16. The lock mechanism of claim 11, wherein each of the first and the second detents comprise a ramp surface along which the respective drive pin is configured to travel.

17. The lock mechanism of claim 11, wherein the driver comprises a cylindrical permanent magnet configured to be rotated by the application of a magnetic field, and a magnet housing disposed about the cylindrical permanent magnet.

18. The lock mechanism of claim 11, wherein the gear is a sun gear, and the driven gear system is a planetary gear system, and
   wherein the sun gear is configured to engage the ring gear via a plurality of planetary gears.

19. The lock mechanism of claim 11, wherein the keyed portion has a square cross-sectional shape, and the keyed opening has a corresponding and complementary square cross-sectional shape.

20. An implantable distraction and compression system comprising:
   a housing configured to be attached to a first bone portion, the housing having a driver, a driven gear system, and a lead screw positioned therein, wherein the lead screw is coupled to the driver via the driven gear system such that rotation of the driver causes rotation of the lead screw;
   a rod configured to be attached to a second bone portion and configured to interact with the lead screw such that, upon rotation of the lead screw, the rod distracts or contracts relative to the housing; and
   a lock mechanism configured to lock and unlock rotation of the driver and the driven gear system, the lock mechanism comprising:
      a drive gear configured to be driven by the driver, and to input torque into the driven gear system, the drive gear comprising a keyed portion, and
      a keeper engaged with the driver and with the keyed portion to move between a locked position and an unlocked position in response to rotation of the driver,
      wherein, in the locked position, the keeper resists rotation of the drive gear and the driver under a load on the lead screw, and in the unlocked position, permits rotation of the drive gear and the driver.

* * * * *